(12) United States Patent
Yoshida et al.

(10) Patent No.: US 12,080,057 B2
(45) Date of Patent: Sep. 3, 2024

(54) IMAGE ANALYSIS APPARATUS, IMAGE ANALYSIS METHOD, AND STORAGE MEDIUM

(71) Applicant: NEC Corporation, Tokyo (JP)

(72) Inventors: Satoshi Yoshida, Tokyo (JP); Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/015,903

(22) PCT Filed: Jul. 20, 2020

(86) PCT No.: PCT/JP2020/028159
§ 371 (c)(1),
(2) Date: Jan. 12, 2023

(87) PCT Pub. No.: WO2022/018809
PCT Pub. Date: Jan. 27, 2022

(65) Prior Publication Data
US 2023/0267727 A1 Aug. 24, 2023

(51) Int. Cl.
*G06F 17/00* (2019.01)
*G06F 3/04817* (2022.01)
(Continued)

(52) U.S. Cl.
CPC ........ *G06V 10/945* (2022.01); *G06F 3/04817* (2013.01); *G06F 3/04847* (2013.01);
(Continued)

(58) Field of Classification Search
CPC .... G06V 10/945; G06V 10/776; G06V 10/87; G06V 10/98; G06V 40/10;
(Continued)

(56) References Cited

U.S. PATENT DOCUMENTS

2007/0047950 A1\* 3/2007 Asami ................ H04N 1/00347
348/E5.042
2007/0277116 A1 11/2007 Nakajima
(Continued)

FOREIGN PATENT DOCUMENTS

JP H11-149369 A 6/1999
JP 2007-317032 A 12/2007
(Continued)

OTHER PUBLICATIONS

Rieffel, Eleanor G., et al. "Geometric tools for multicamera surveillance systems." 2007 First ACM/IEEE International Conference on Distributed Smart Cameras. IEEE, 2007 (Year: 2007).\*
(Continued)

*Primary Examiner* — Andrew T McIntosh

(57) ABSTRACT

An image analysis apparatus (102) includes: an icon placement unit (107) accepting an instruction for placing, on a screen, a plurality of icons including a plurality of input source icons each indicating an input source of image data being a target of analysis, a plurality of image processing icons each indicating an image processing engine for the image data, and at least one output destination icon indicating an output destination of a processing result by an image processing engine, and placing the plurality of icons on the screen in accordance with the instruction; a connection unit (110) accepting a connection instruction for connecting icons placed on the screen; and a data flow setting unit (111) setting a flow of data between the icons in accordance with the connection instruction and displaying the flow on the screen.

20 Claims, 24 Drawing Sheets

(51) Int. Cl.
  *G06F 3/04847* (2022.01)
  *G06V 10/70* (2022.01)
  *G06V 10/776* (2022.01)
  *G06V 10/94* (2022.01)
  *G06V 10/98* (2022.01)
  *G06V 40/10* (2022.01)

(52) U.S. Cl.
  CPC ............ *G06V 10/776* (2022.01); *G06V 10/87* (2022.01); *G06V 10/98* (2022.01); *G06V 40/10* (2022.01); *G06V 2201/07* (2022.01)

(58) Field of Classification Search
  CPC ................ G06V 2201/07; G06V 20/52; G06F 3/04817; G06F 3/04847; G06T 1/00; G06T 7/00
  See application file for complete search history.

(56) References Cited

U.S. PATENT DOCUMENTS

| | | | |
|---|---|---|---|
| 2011/0188713 A1* | 8/2011 | Chin | G06F 16/583 382/118 |
| 2013/0147961 A1* | 6/2013 | Gao | H04N 7/181 348/159 |
| 2014/0026136 A1 | 1/2014 | Shiraishi et al. | |
| 2017/0351906 A1* | 12/2017 | Oguchi | H04N 7/18 |
| 2018/0107880 A1* | 4/2018 | Danielsson | G08B 13/194 |
| 2018/0374233 A1* | 12/2018 | Zhou | G06F 18/22 |
| 2021/0142045 A1* | 5/2021 | Noest | H04N 13/282 |
| 2022/0058110 A1 | 2/2022 | Yamamoto | |

FOREIGN PATENT DOCUMENTS

| | | | | |
|---|---|---|---|---|
| JP | 2011-002930 A | 1/2011 | | |
| JP | 2013-114457 A | 6/2013 | | |
| JP | 2015-087940 A | 5/2015 | | |
| JP | 2016-106312 A | 6/2016 | | |
| JP | 2018-181081 A | 11/2018 | | |
| JP | 2019-054896 A | 4/2019 | | |
| WO | 2012/108125 A1 | 8/2012 | | |
| WO | WO-2014182898 A1 * | 11/2014 | ......... | G06K 9/00671 |
| WO | 2020/110933 A1 | 6/2020 | | |

OTHER PUBLICATIONS

Ivanov, Yuri, et al. "Tracking people in mixed modality systems." Visual Communications and Image Processing 2007. vol. 6508. SPIE, 2007 (Year: 2007).*

International Search Report for PCT Application No. PCT/JP2020/028159, mailed on Sep. 15, 2020.

Eguchi, Megumi, "Examples of "Visual Applets" and "BLOB" algorithms capable of drag-and-drop FPGA program design". Imaging Information Industrial., Jan. 1, 2010, vol. 42, No. 1, pp. 41-46, ISSN 1346-1362, in particular, p. 42 non-official translation.

Yoshikawa, Shigeo., "EVT Software "EyeVision" Machine Vision Detection Image Processing Program Made Simple". Image Laboratory., Oct. 10, 2017, vol. 28, No. 10, pp. 50-55, ISSN 0915-6755, in particular, pp. 51-52 non-official translation.

Yamamoto, Ryutaro., "AI Image Detection System AI Inspector for Production Processes". Imaging Information Industrial., Dec. 1, 2018, vol. 50, No. 12, pp. 99-106, ISSN 1346-1362, entire text, all drawings, non-official translation.

JP Office Action for JP Application No. 2022-538515, mailed on Feb. 20, 2024 with English Translation.

JP Office Communication for JP Application No. 2022-538515, mailed on Jul. 9, 2024 with English Translation.

* cited by examiner

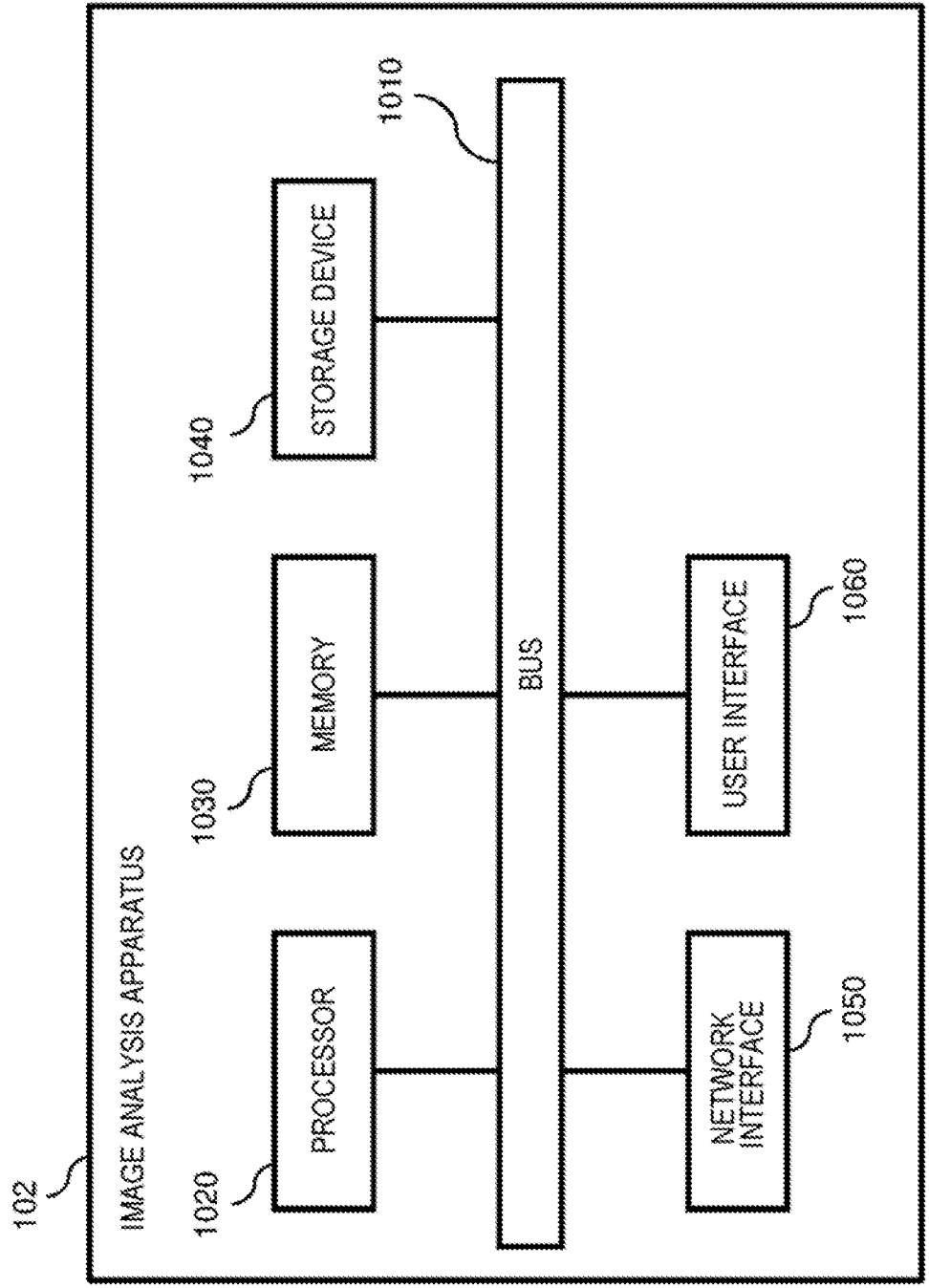

IMAGE ANALYSIS APPARATUS, IMAGE ANALYSIS METHOD, AND STORAGE MEDIUM

This application is a National Stage Entry of PCT/JP2020/028159 filed on Jul. 20, 2020, the contents of all of which are incorporated herein by reference, in their entirety.

TECHNICAL FIELD

The present invention relates to an image analysis apparatus, an image analysis method, and a storage medium.

BACKGROUND ART

For example, technologies described in Patent Documents 1 to 4 are proposed as apparatuses and systems assisting image analysis.

A medical image processing apparatus described in Patent Document 1 includes an image acquisition unit acquiring a medical image from a medical image diagnosis apparatus, an image processing unit performing predetermined image processing on the acquired medical image, and an input unit for an operator. Then, the medical image processing apparatus is configured to redo image processing by the image processing unit on a medical image undergoing image processing by the image processing unit, based on an indication by an operator through the input unit.

A medical image processing system described in Patent Document 2 provides sharing and real-time coordination of a series of image improvement processing on a CT image executed on a network by using a server being connected to the network and including dedicated hardware and software, and a dedicated application on a client terminal.

An image recognition engine coordination apparatus described in Patent Document 3 includes a coordination processing unit executing engine coordination processing including inquiry processing to a plurality of engines including an image recognition engine and a barcode detection engine being another type of engine recognizing a subject in an image by an image analysis technique different from that of the image recognition engine, and acceptance processing of a recognition result based on the inquiry processing. The coordination processing unit manages the engine coordination processing as a coordination scenario.

An analysis engine control apparatus described in Patent Document 4 includes an analysis engine meta-information table storing details of analysis processing and a characteristic of an analysis processing result for each analysis engine, a process flow generation means for selecting, in response to an analysis processing request in which details of analysis processing and a condition of an analysis processing result are set, a plurality of analysis engines executing analysis processing satisfying the condition of the analysis processing result and being related to the details of the analysis processing and generating a process flow, and analysis processing execution means executing analysis processing, based on the generated process flow. The process flow generation means corrects the process flow, based on the analysis engine meta-information table, in such a way that analysis processing satisfying the condition of the analysis processing result and being related to the details of the analysis processing is executed based on the actually executed analysis processing result.

RELATED DOCUMENT

Patent Document

Patent Document 1: Japanese Patent Application Publication No. 2019-54896

Patent Document 2: Japanese Patent Application Publication No. 2016-106312

Patent Document 3: Japanese Patent Application Publication No. 2018-181081

Patent Document 4: International Application Publication No. WO 2012/108125

SUMMARY OF THE INVENTION

Technical Problem

In general, image processing engines including a plurality of functions are prepared in analysis of image data, and a suitable image processing engine needs to be selected out of the previously prepared image processing engines, based on the purpose of the analysis. Further, when analyzing image data captured by a plurality of cameras, an image processing engine selected for each piece of image data needs to be configured in association with the image data. Specifically, in analysis of image data, a plurality of image processing engines need to be suitably connected and configured from input of the image data to output of the analysis result.

In such analysis of image data, in order to suitably configure the entire processing from input of image data to acquisition of a suitable analysis result through image processing by an image processing engine, highly professional knowledge and experience related to image analysis are often required. Therefore, it is difficult for a non-engineer having no professional knowledge of image analysis to suitably configure the entire analysis processing of image data under the existing circumstances.

The technologies described in the Patent documents 1 to 4 are premised on performing analysis of image data by an engineer having professional knowledge and experience; and even when a non-engineer refers to the technologies, it is still considered difficult to suitably configure the entire analysis processing of image data.

The present invention has been made in view of the aforementioned circumstances, and an object of the present invention is to provide an image analysis apparatus and the like that can easily execute suitable configuration of the entire analysis processing of image data.

Solution to Problem

In order to achieve the aforementioned object, an image analysis apparatus according to a first aspect of the present invention includes:

an icon placement means for accepting an instruction for placing, on a screen, a plurality of icons including a plurality of input source icons each indicating an input source of image data being a target of analysis, a plurality of image processing icons each indicating an image processing engine for the image data, and at least one output destination icon indicating an output destination of a processing result by an image processing engine, and placing the plurality of icons on a screen in accordance with the instruction;

a connection means for accepting a connection instruction for connecting icons placed on the screen; and a data flow setting means for setting a flow of data between the icons in accordance with the connection instruction and displaying the flow on the screen.

In order to achieve the aforementioned object, an image analysis method according to a second aspect of the present invention includes:

accepting an instruction for placing, on a screen, a plurality of icons including a plurality of input source icons each indicating an input source of image data being a target of analysis, a plurality of image processing icons each indicating an image processing engine for the image data, and at least one output destination icon indicating an output destination of a processing result by an image processing engine, and placing the plurality of icons on a screen in accordance with the instruction;

accepting a connection instruction for connecting icons placed on the screen; and setting a flow of data between the icons in accordance with the connection instruction and displaying the flow on the screen.

In order to achieve the aforementioned object, a non-transitory storage medium storing a program according to a third aspect of the present invention causes a computer to execute:

accepting an instruction for placing, on a screen, a plurality of icons including a plurality of input source icons each indicating an input source of image data being a target of analysis, a plurality of image processing icons each indicating an image processing engine for the image data, and at least one output destination icon indicating an output destination of a processing result by an image processing engine, and placing the plurality of icons on a screen in accordance with the instruction;

accepting a connection instruction for connecting icons placed on the screen; and setting a flow of data between the icons in accordance with the connection instruction and displaying the flow on the screen.

Advantageous Effects of Invention

The present invention enables easy execution of suitable configuration of the entire analysis processing of image data.

BRIEF DESCRIPTION OF THE DRAWINGS

FIG. 6 is a diagram illustrating a physical configuration of an image analysis apparatus according to the example embodiment.

DESCRIPTION OF EMBODIMENTS

An example embodiment of the present invention will be described below referring to drawings. Identical components are given identical signs throughout the diagrams. Note that, in every drawing, similar components are given similar signs, and description thereof is omitted as appropriate.

Figure 1:
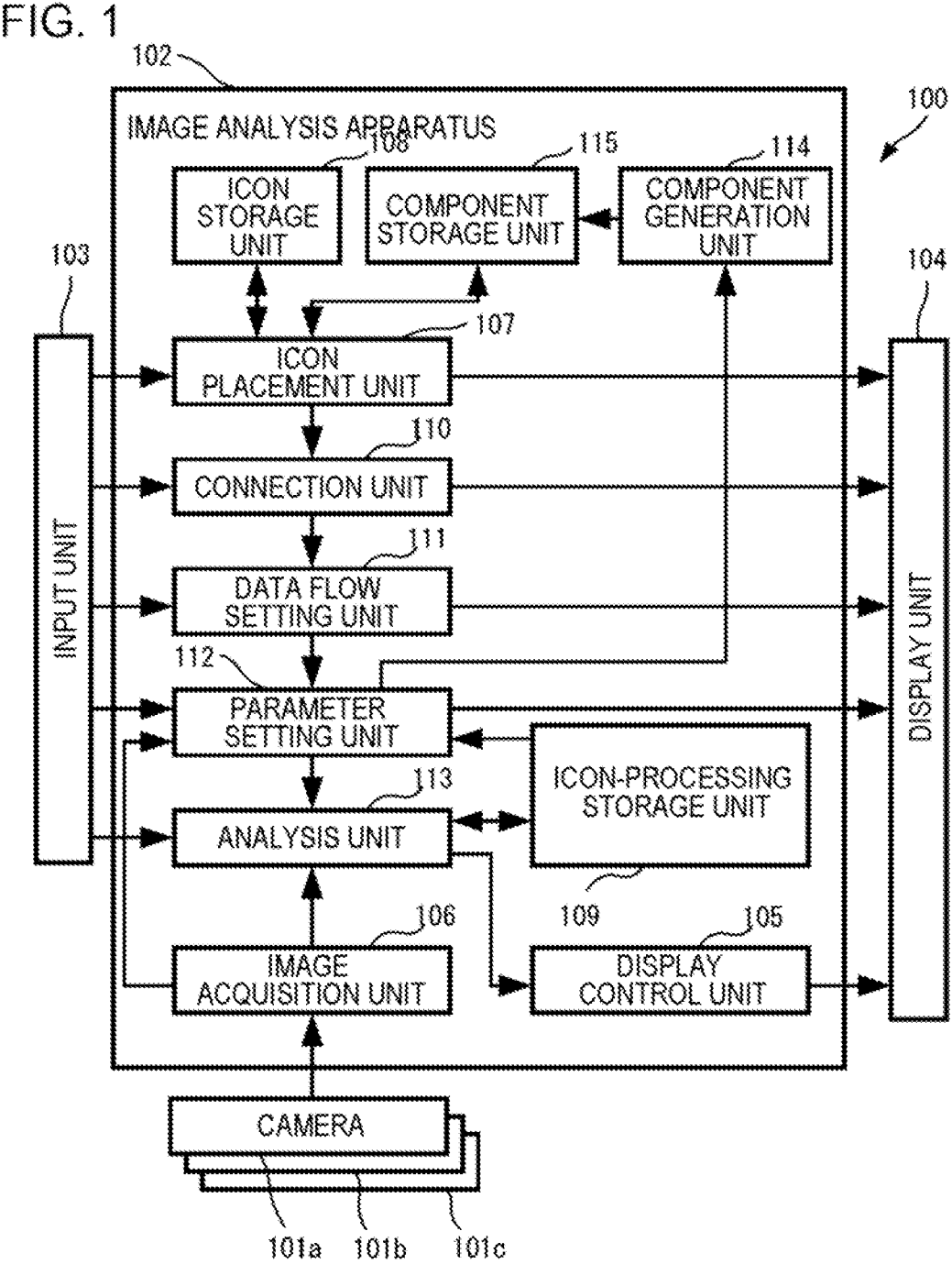
FIG. 1 is a diagram illustrating a configuration of an image analysis system according to an example embodiment of the present invention.

Functional Configuration of Image Analysis System According to Present Example Embodiment An image analysis system 100 according to an example embodiment of the present invention is a system for acquiring an intended analysis result by performing image processing on image data in which an analysis target region is captured. As illustrated in FIG. 1, the image analysis system 100 according to the present example embodiment includes three cameras 101a, 101b, and 101c and an image analysis apparatus 102.

Each of the cameras 101a, 101b, and 101c is an example of an image capture apparatus for capturing an image of an analysis target region. When not being particularly distinguished, the cameras 101a, 101b, and 101c are also simply expressed as cameras 101 below.

Figure 2:
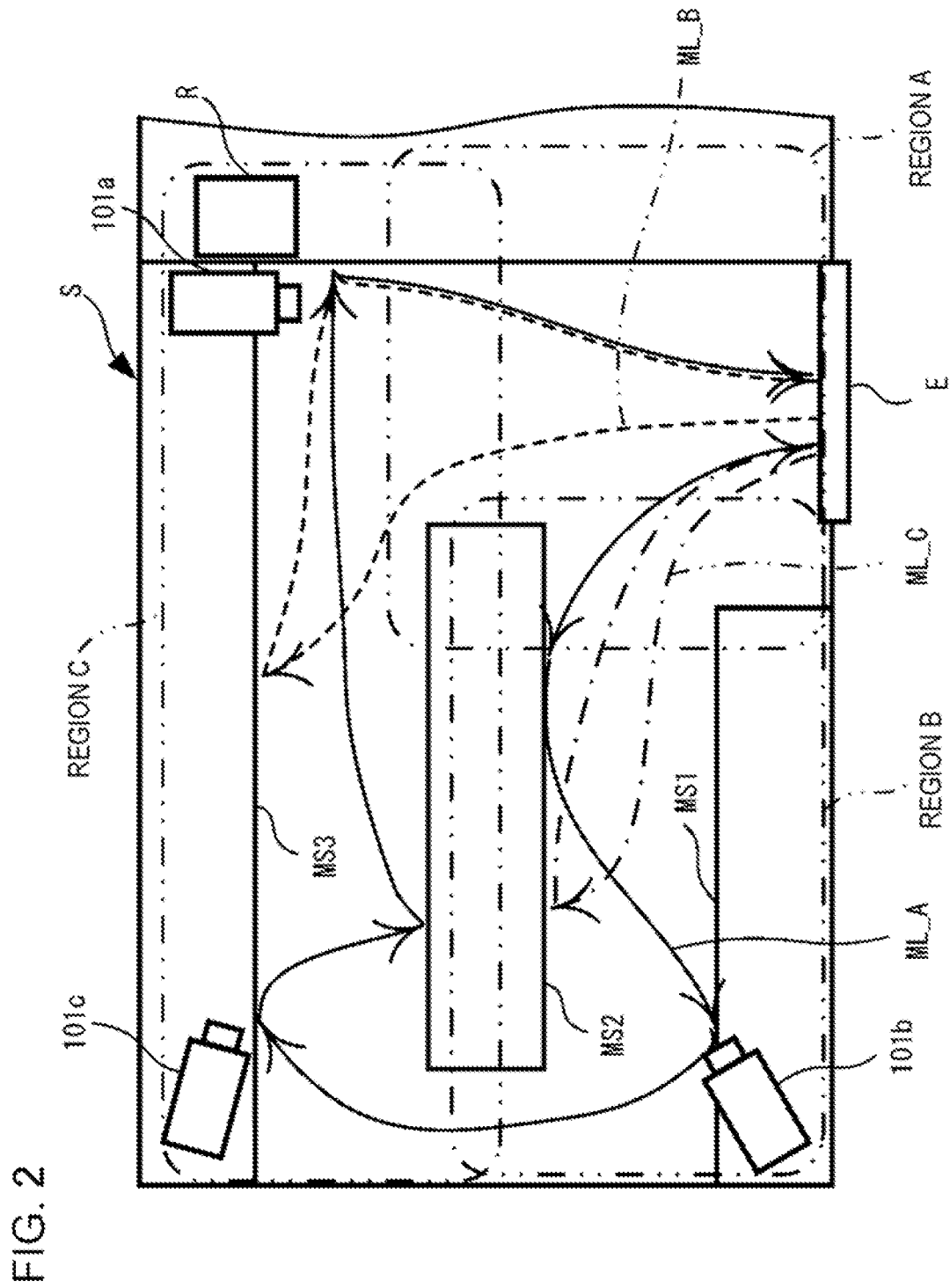
FIG. 2 is a diagram of a store as an analysis target region according to the example embodiment viewed from above.

As illustrated in FIG. 2 being a diagram of the inside of a store S as an analysis target region viewed from above, the cameras 101 according to the present example embodiment are installed in such a way as to capture images of roughly the entire inside of the store S as the analysis target region.

Specifically, the camera 101a is installed in such a way as to capture an image of a region A in the store S, the camera 101b is installed in such a way as to capture an image of a region B in the store S, and the camera 101c is installed in such a way as to capture an image of a region C in the store S. In order to capture images of roughly the entire inside of the store S, the region A, the region B, and the region C overlap one another.

For example, such cameras 101 capture images of scenes in which movements of customers A to C entering the store S through an entrance E passing by shelves MS1, MS2, and MS3 on which products are displayed and the vicinity of a register apparatus R and exiting from the entrance E as illustrated in FIG. 2.

A moving route M_A indicated in solid lines in FIG. 2 represents a moving route of the customer A in the store S, a moving route M_B indicated in dotted lines represents a moving route of the customer B in the store S, and a moving route M_C indicated by dot-and-dash lines represents a moving route of the customer C in the store S.

Note that an example of applying image analysis by the image analysis system 100 to behavior analysis of a person at a retail store such as the store S will be described in the present example embodiment. However, image analysis by the image analysis system 100 is applicable to other types of behavior analysis of a person, a search for a person, analysis of expertise, and the like. Examples of other types of behavior analysis of a person include image analysis intended for administration, city planning, traffic, and transportation. Examples of a search for a person include image analysis intended for criminal investigation, surveillance, and a search for a missing child. Examples of analysis of expertise include image analysis intended for acquisition of skills of a skilled worker at a manufacture or working site, a worker at a construction site, an athlete, and an educator. Then, for example, a building, a facility, equipment, and a road may be set as an analysis target region depending on the purpose of the image analysis.

Note that the number of cameras 101 to be installed has only to be two or more; and each of the cameras 101a, 101b, and 101c may capture a static image, according to the present example embodiment.

The image analysis apparatus 102 functionally includes an input unit 103, a display unit 104, a display control unit 105, an image acquisition unit 106, an icon placement unit 107, an icon storage unit 108, an icon-processing storage unit 109, a connection unit 110, a data flow setting unit 111, a parameter setting unit 112, an analysis unit 113, a component generation unit 114, and a component storage unit 115, as illustrated in FIG. 1.

The input unit 103 is a keyboard, a mouse, a touch panel, and/or the like for user input.

The display unit 104 is a liquid crystal display or the like for displaying a screen.

The display control unit 105 causes the display unit 104 to display a screen.

The image acquisition unit 106 acquires image data being a target of analysis.

The icon placement unit 107 accepts an instruction for placing a plurality of icons on the screen from the input unit 103 and places the plurality of icons on the screen in accordance with the instruction.

The icon storage unit 108 is a storage unit for holding icon data including icon images. Specifically, for example, icon data are data associating icon type information for identifying the type of an icon with image information of the icon.

Examples of an icon include an input source icon, an image processing icon, and an output destination icon.

The input source icon is an icon indicating an input source of image data being a target of analysis. The image processing icon is an icon indicating an image processing engine for image data. The output destination icon is an icon indicating an output destination of a processing result by an image processing engine.

The icon-processing storage unit 109 is a storage unit for holding processing engine data including a processing engine. Specifically, for example, processing engine data are data associating icon identification information with a processing engine and a parameter to be set.

Examples of a processing engine include an input engine performing input processing on image data being a target of analysis, an image processing engine performing various types of image processing on the image data, and an output engine performing output processing of a processing result.

The input engine is a real-time input engine inputting image data from a camera 101 roughly in real time. Examples of a parameter of the real-time input engine include a network address of a camera 101 being a generator of the real-time input engine.

Note that the input engine may be a held-data input engine inputting image data saved in a storage unit; and examples of a parameter of the held-data input engine include information indicating a location where image data are saved.

Examples of the image processing engine include a detection engine, a tracking engine, a feature value extraction engine, a retrieval engine, and a redetermination engine.

The detection engine is an image processing engine for detecting a detection target such as an object or a person from image data.

The tracking engine is an image processing engine for tracking a tracking target such as an object or a person in image data.

The feature value extraction engine is an image processing engine for extracting a feature value in image data.

The retrieval engine is an image processing engine for retrieving a retrieval target such as an object or a person from image data.

The redetermination engine is an image processing engine for tracking a tracking target such as an object or a person across a plurality of pieces of image data.

A model learned by machine learning is suitably employed in the image processing engines, and a parameter in this case is a parameter for adjusting the learned model. While value setting of a plurality of parameters may be required for execution of image processing by one image processing engine, it is assumed in the present example embodiment that one parameter is required for each image processing engine to perform image processing.

Further, when icons associated with the detection engine, the tracking engine, the feature value extraction engine, the retrieval engine, and the redetermination engine among image processing icons are to be distinguished, the icons are respectively referred to as a detection icon, a tracking icon, a feature value extraction icon, a retrieval icon, and a redetermination icon.

The output engine is an engine outputting a processing result on a screen. Examples of a parameter of the output engine include information for identifying a screen being an output destination.

Note that when there are a plurality of screens being output destinations, the plurality of screens may be displayed on one display apparatus or may be displayed on a plurality of displays, respectively. When the plurality of screens are output to a plurality of displays, a parameter of the output engine may be information for identifying each display.

The connection unit 110 accepts a connection instruction for connecting icons placed on the screen from the input unit 103.

The data flow setting unit 111 sets a flow of data between icons in accordance with a connection instruction accepted by the connection unit 110 and displays the flow on the screen.

Figure 3:
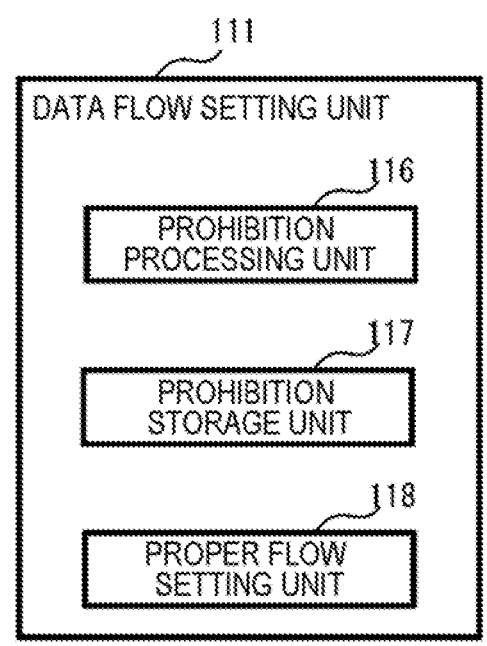
FIG. 3 is a diagram illustrating a functional configuration of a data flow setting unit according to the example embodiment.

Specifically, the data flow setting unit 111 includes a prohibition processing unit 116, a prohibition storage unit 117, and a proper flow setting unit 118, as illustrated in FIG. 3.

When a connection instruction is accepted by the connection unit 110, the prohibition processing unit 116 determines whether a connection between icons related to the connection instruction is included in prohibition data and performs prohibition processing, based on the determination result.

Prohibition data are data indicating a prohibition related to a connection between icons and are preset in the prohibition storage unit 117 for holding the data.

Prohibition data include a prohibited connection relation between icons as a prohibition.

A connection relation is a relation related to a connection between icons and includes a flow of data between processing engines related to the connected icons. Connection relations between icons not normally established typically include an opposite connection order between icons, examples of which including a connection relation in which data flow from another icon to an input source icon and a connection relation in which data flow from an output destination icon to another icon.

Note that when a face detection engine being a type of the detection engine and a color extraction engine being a type of the feature value extraction engine are employed, the face detection engine and the color extraction engine are not normally connected, and therefore the prohibition may include a connection between icons related to the engines.

More specifically, when determining that a connection between icons related to a connection instruction is not included in prohibition data, the prohibition processing unit 116 sets a flow of data in accordance with the connection instruction and displays the flow on the screen. On the other hand, when determining that the connection between the icons related to the connection instruction is included in the prohibition data, the prohibition processing unit 116 performs prohibition processing.

The prohibition processing includes at least one item out of not setting a connection relation, setting a connection relation acquired by correcting the connection instruction by a predetermined method, and making notification that a connection between icons related to the connection instruction is prohibited.

The proper flow setting unit 118 sets a flow of data between icons in accordance with a connection instruction accepted by the connection unit 110 and displays the flow on the screen.

FIG. 1 is referred to again.

The parameter setting unit 112 accepts a set value of a parameter associated with each icon placed on the screen. When an icon placed on the screen is selected, the parameter setting unit 112 accepts a set value of a parameter applied to a processing engine related to the selected icon and sets the accepted set value to the selected icon.

Figure 4:
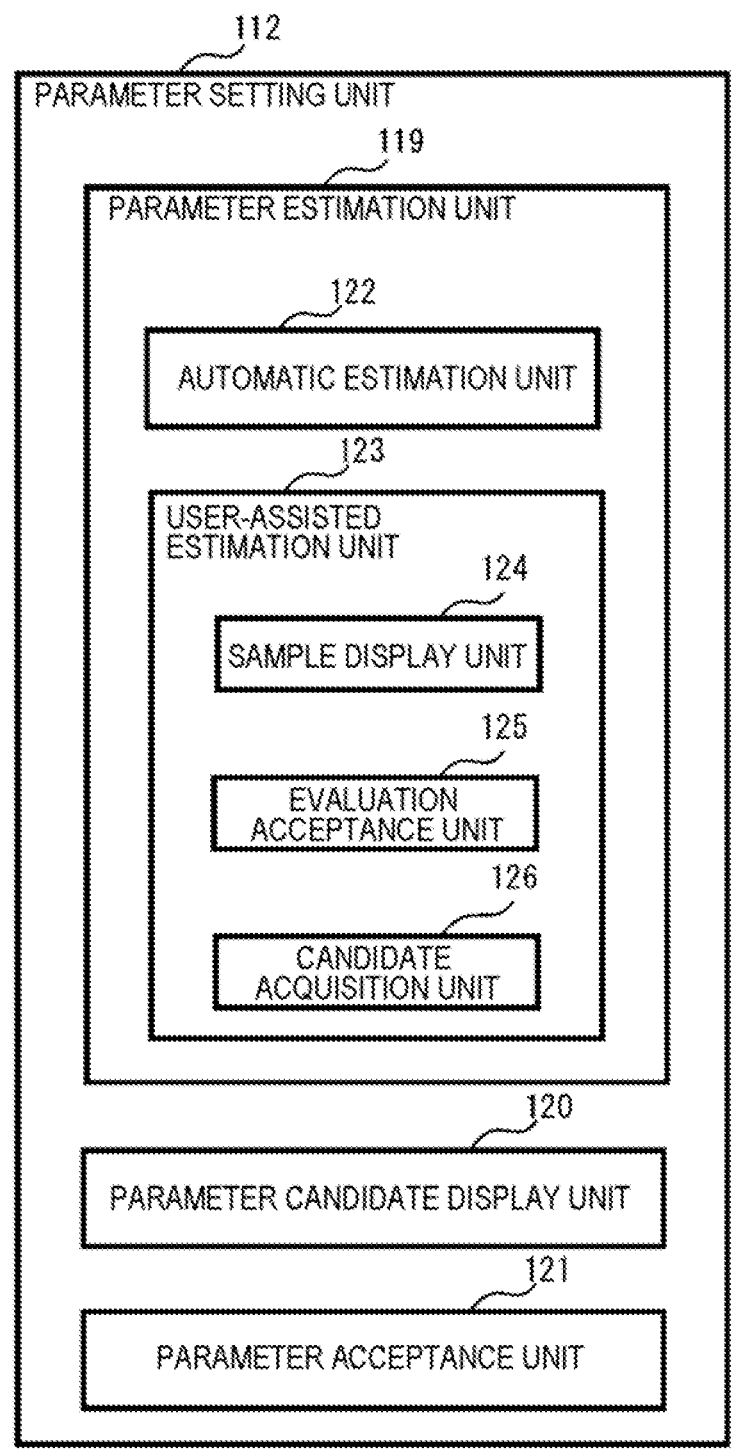
FIG. 4 is a diagram illustrating a functional configuration of a parameter setting unit according to the example embodiment.

Specifically, the parameter setting unit 112 includes a parameter estimation unit 119 finding a candidate of a set value for a parameter, a parameter candidate display unit 120 displaying a candidate on the screen, and a parameter acceptance unit 121 accepting a set value of a parameter, as illustrated in FIG. 4.

When an image processing icon placed on the screen is selected, the parameter estimation unit 119 finds a candidate of a set value for a parameter, based on at least part of image data.

A candidate of a set value for a parameter is a candidate of a set value for a parameter applied to an image processing engine related to the selected image processing icon, and the candidate is found as a value, a numeric value range, or the like. Image data referred to for finding a candidate are desirably partial image data in order to lighten a processing load for finding the candidate.

More specifically, the parameter estimation unit 119 includes an automatic estimation unit 122 estimating a candidate by itself without receiving user assistance and a user-assisted estimation unit 123 estimating a candidate by receiving user assistance, as illustrated in FIG. 4.

The automatic estimation unit 122 automatically estimates a candidate of a set value for a parameter applied to an image processing engine related to a selected image processing icon.

The user-assisted estimation unit 123 estimates a candidate of a set value for a parameter applied to an image processing engine related to a selected image processing icon, with reference to a user evaluation. The user-assisted estimation unit 123 includes a sample display unit 124, an evaluation acceptance unit 125, and a candidate acquisition unit 126.

When an image processing icon placed on the screen is selected, the sample display unit 124 executes processing by an image processing engine associated with the selected image processing icon on at least part of image data. The sample display unit 124 displays, on the screen, one or a plurality of sample images acquired by executing the processing.

The evaluation acceptance unit 125 accepts evaluations of one or a plurality of sample images from the input unit 103.

The candidate acquisition unit 126 finds a candidate of a set value, based on an evaluation accepted by the evaluation acceptance unit 125.

The parameter candidate display unit 120 displays a candidate found by the parameter estimation unit 119 on the screen.

The parameter acceptance unit 121 accepts a set value of a parameter in association with a selected image processing icon. Specifically, a user can set a set value of a parameter with reference to a candidate displayed on the screen.

The analysis unit 113 executes, on image data, analysis processing in accordance with an analysis configuration set on the screen and displays the result of the analysis processing on the screen through the display control unit 105. An analysis configuration set on the screen refers to a processing configuration for analyzing image data and includes a plurality of icons placed on the screen and a connection relation between the plurality of icons.

Figure 5:
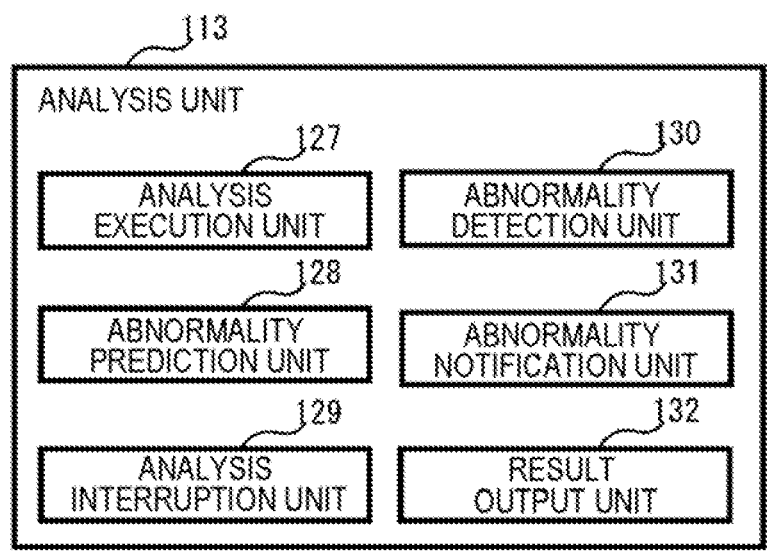
FIG. 5 is a diagram illustrating a functional configuration of an analysis unit according to the example embodiment.

Specifically, the analysis unit 113 includes an analysis execution unit 127, an abnormality prediction unit 128, an analysis interruption unit 129, an abnormality detection unit 130, an abnormality notification unit 131, and a result output unit 132, as illustrated in FIG. 5.

The analysis execution unit 127 executes analysis processing in accordance with analysis configuration set on the screen.

The abnormality prediction unit 128 surveilles analysis processing by the analysis execution unit 127 and predicts whether an abnormality occurs in the result of the analysis processing. When an abnormality is predicted to occur by the abnormality prediction unit 128, the analysis interruption unit 129 makes notification for prompting change of a set value.

The abnormality detection unit 130 determines whether a result of analysis processing by the analysis execution unit 127 includes an abnormality. When an abnormality is determined to be included, the abnormality notification unit 131 makes notification for prompting change of a set value.

For example, an abnormality refers to, when an image processing engine associated with an image processing icon placed on the screen includes a function of identifying a person, a plurality of persons included in a frame image constituting image data being analyzed to be identical persons.

Further, for example, an abnormality refers to, when an analysis target is a plurality of pieces of image data acquired by capturing images of different regions A to C in a continuous space such as the store S, the number of persons analyzed to be identical persons between the plurality of pieces of image data is less than a threshold value. This example also targets a case of an image processing engine associated with an image processing icon placed on the screen including the function of identifying a person.

Examples of notification include displaying a message through the display control unit 105 and making a sound from an unillustrated speaker or the like.

When occurrence of an abnormality is not predicted by the abnormality prediction unit 128 and analysis processing is ended without detecting an abnormality by the abnormality detection unit 130, the result output unit 132 displays, on the screen, the result of the analysis processing based on an analysis configuration.

In order to execute analysis processing, a group of set values constituted of set values set to all parameters of processing engines included in one analysis configuration is required. Specifically, it is assumed that set values need to be set to all parameters related to a plurality of icons placed on the screen and that a group of set values is constituted of set values for all the parameters.

For example, as described above, the number of parameters for performing image processing by each image processing engine is one, and the number of parameters of each of the input source icon and the output destination icon is also one, according to the present example embodiment. Therefore, a group of set values according to the present example embodiment is constituted of one set value associated with each of a plurality of icons placed on the screen.

The parameter setting unit 112 according to the present example embodiment may accept a plurality of set values for parameters associated with part or all of image processing engines placed on the screen, and a plurality of groups of set values are accepted for an analysis configuration set on the screen in this case.

When a plurality of groups of set values are thus set, the analysis unit 113 executes analysis processing on image data in accordance with an analysis configuration set on the screen for each group of set values. In other words, the analysis unit 113 executes analysis processing for every combination of set values being set. Then, every time analysis processing ends for each group of set values, the analysis unit 113 displays the result of the analysis processing on the screen through the display control unit 105.

The component generation unit 114 accepts selection of part or all of a plurality of icons being placed and connected on the screen, generates component data including the selected plurality of icons and a connection relation between the plurality of icons, and causes the component storage unit 115 to hold the component data.

The component storage unit 115 is a storage unit for holding component data generated by the component generation unit 114. Component data are data indicating a component, and a component is constituted of a plurality of icons and a connection relation between the plurality of icons.

A component held in the component storage unit 115 is referred to by the icon placement unit 107 and is placed as an element for generating an analysis configuration, similarly to icons.

Physical Configuration of Image Analysis Apparatus According to Present Example Embodiment From here onward, an example of a physical configuration of the image analysis apparatus 102 according to the present example embodiment will be described with reference to diagrams.

The image analysis apparatus 102 physically includes a bus 1010, a processor 1020, a memory 1030, a storage device 1040, a network interface 1050, and a user interface 1060, as illustrated in FIG. 6.

The bus 105 is a data transmission channel for the processor 1020, the memory 1030, the storage device 1040, the network interface 1050, and the user interface 1060 to transmit and receive data to and from one another. Note that the method for interconnecting the processor 1020 and other components is not limited to a bus connection.

The processor 1020 is a processor provided by a central processing unit (CPU), a graphics processing unit (GPU), or the like.

The memory 1030 is a main storage provided by a random access memory (RAM) or the like.

The storage device 1040 is an auxiliary storage provided by a hard disk drive (HDD), a solid state drive (SSD), a memory card, a read only memory (ROM), or the like.

The storage device 1040 provides the storage units (the icon storage unit 108, the icon-processing storage unit 109, and the component storage unit 115) in the image analysis apparatus 102.

Further, the storage device 1040 stores program modules for providing the functional units (the display control unit 105, the image acquisition unit 106, the icon placement unit 107, the connection unit 110, the data flow setting unit 111, the parameter setting unit 112, the analysis unit 113, and the component generation unit 114) in the image analysis apparatus 102. By reading each program module into the memory 1030 and executing the program module by the processor 1020, each functional unit related to the program module is provided.

The network interface 1050 is an interface for connecting the image analysis apparatus 102 to a wired network, a wireless network, or a network combining the two. The image analysis apparatus 102 according to the present example embodiment communicates with a camera 101 by being connected to the network through the network interface 1050.

The user interface 1070 is an interface inputting information from a user and an interface providing the user with information, examples of which including a mouse, a keyboard, and a touch sensor as the input unit 103 and a liquid crystal display as the display unit 104.

Thus, the functions of the image analysis apparatus 102 can be provided by executing a software program by the physical components in cooperation with each other. Therefore, the present invention may be provided as a software program or may be provided as a non-transitory storage medium having the program recorded thereon.

Image Analysis Processing According to Present Example Embodiment

From here onward, image analysis processing according to the present example embodiment will be described with reference to diagrams.

Figure 7A:
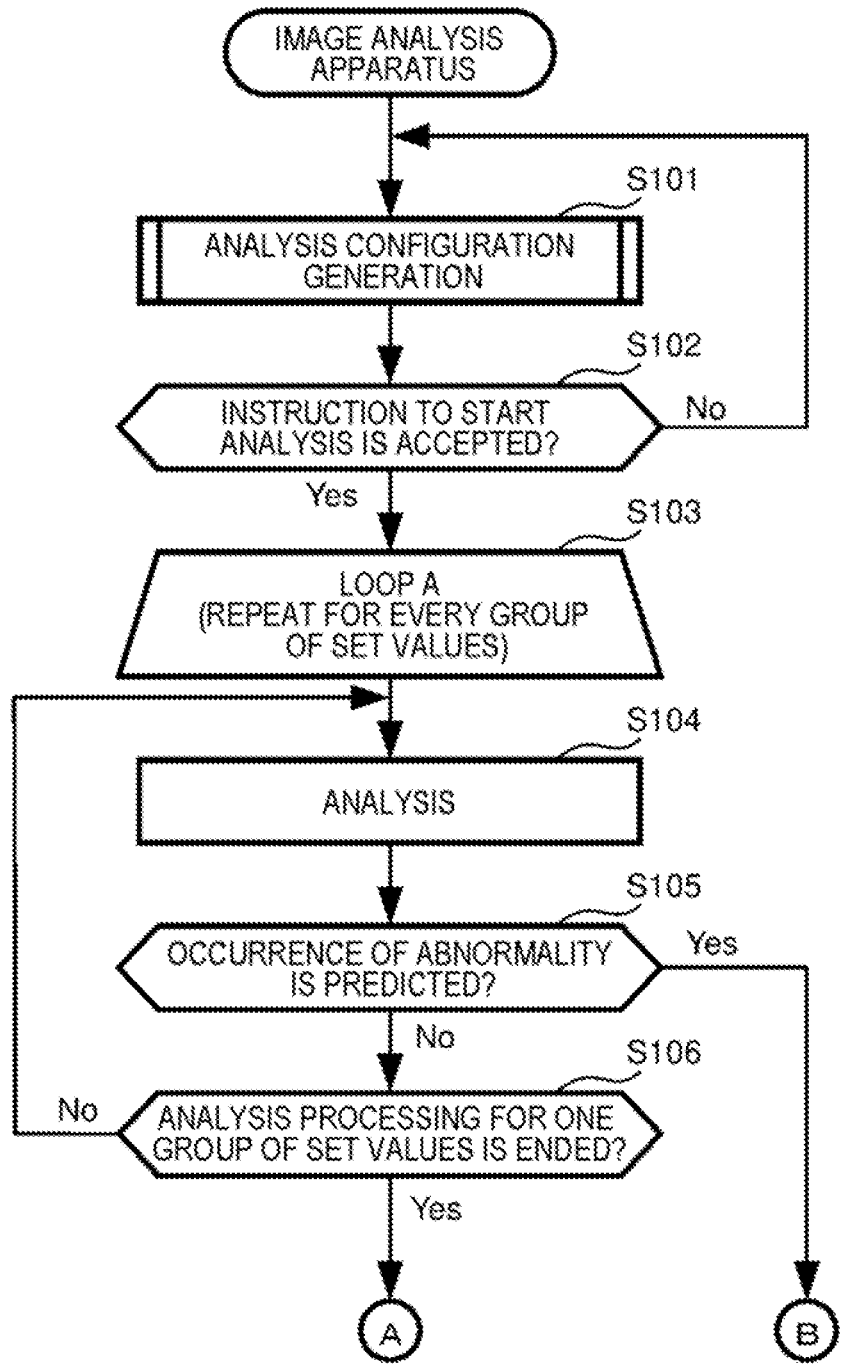
FIG. 7A is a flowchart illustrating an example of image analysis processing according to the example embodiment of the present invention.
Figure 7B:
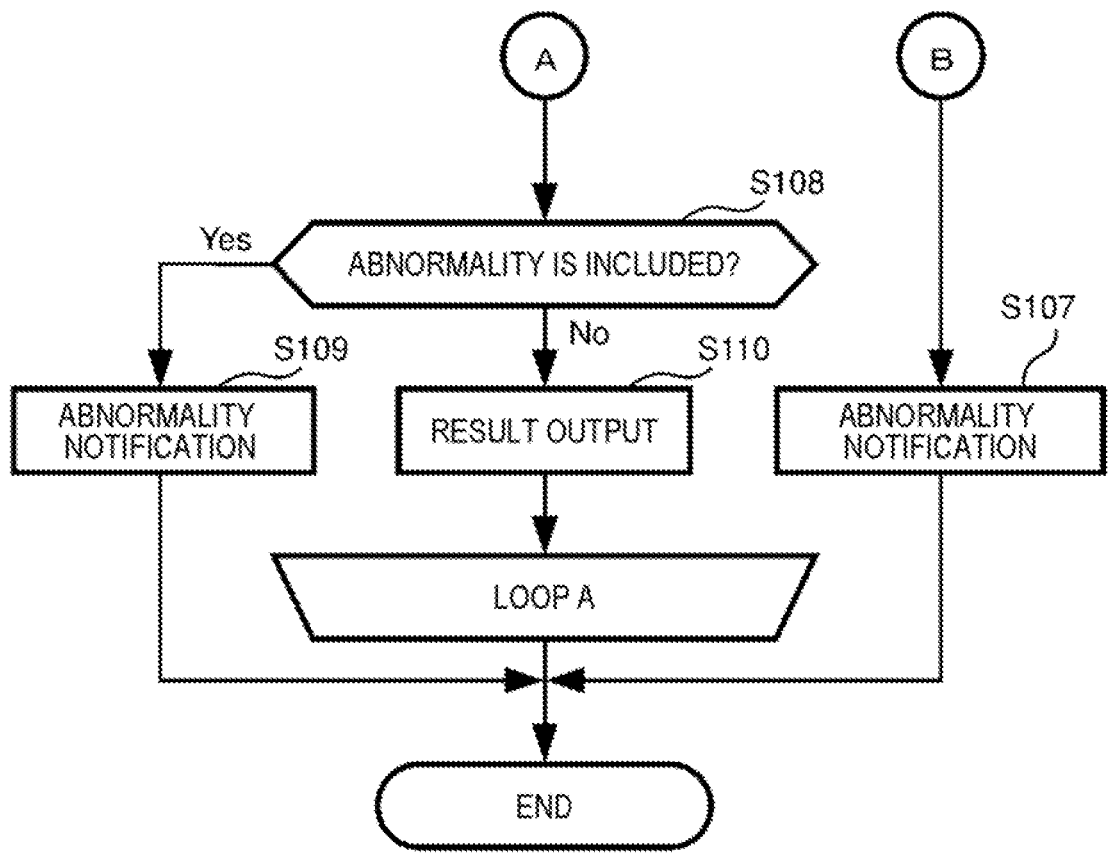
FIG. 7B is a flowchart illustrating the example of the image analysis processing according to the example embodiment of the present invention.

FIGS. 7A and 7B are flowcharts illustrating an example of image analysis processing according to the present example embodiment.

The image analysis processing is processing of generating an analysis configuration for analyzing an image and analyzing the image by the generated analysis configuration and, for example, is started by accepting a start instruction by a user from the input unit 103.

As described in FIG. 7A, the icon placement unit 107, the connection unit 110, the data flow setting unit 111, and the parameter setting unit 112 perform processing for generating an analysis configuration (S101).

Figure 8:
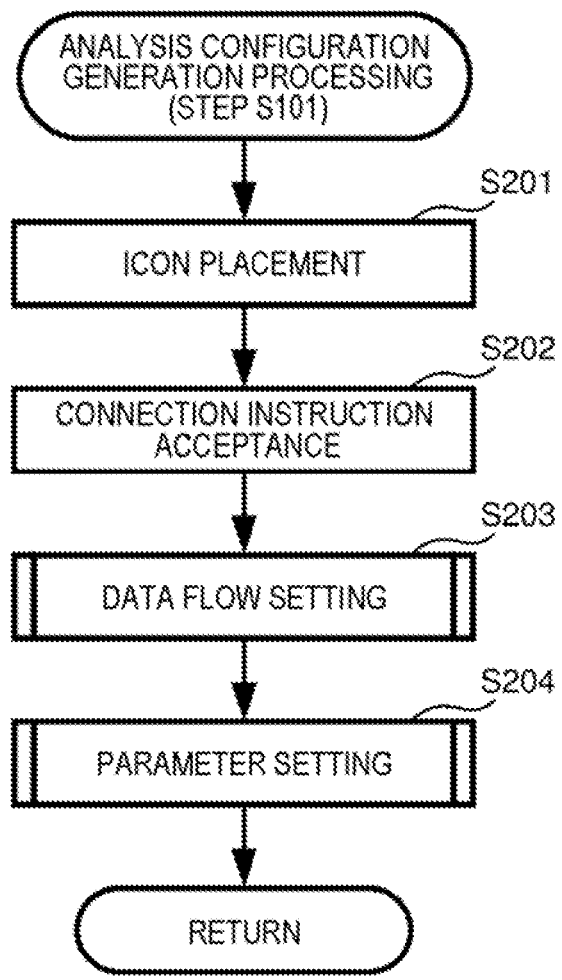
FIG. 8 is a flowchart illustrating an example of analysis configuration generation processing according to the example embodiment.

Specifically, as described in FIG. 8, the icon placement unit 107 places icons on the screen in accordance with a user instruction from the input unit 103 (Step S201).

Figure 9:
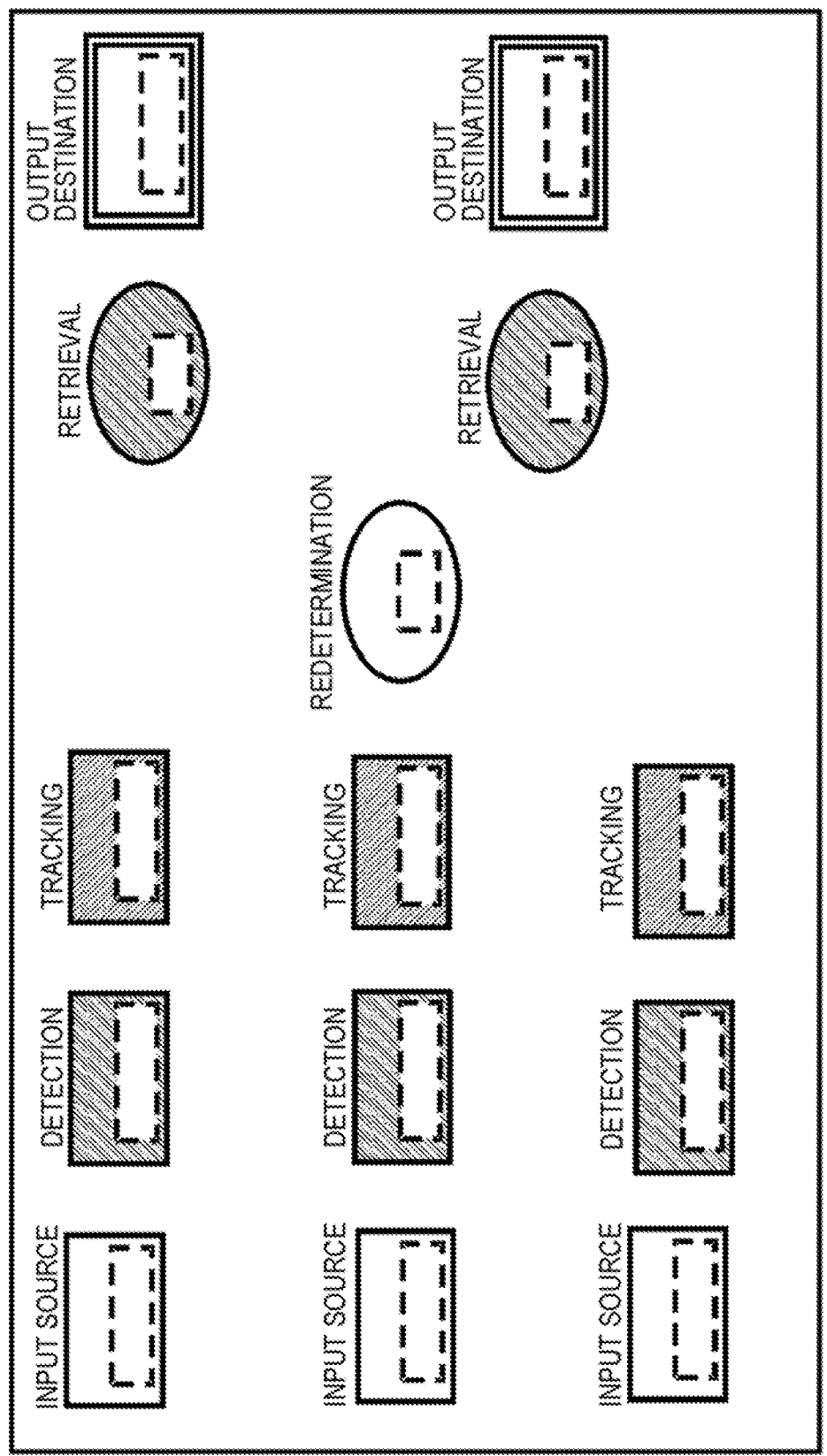
FIG. 9 is a diagram illustrating an example of icons placed on a screen.

FIG. 9 illustrates an example of icons placed on the screen in Step S201. For example, a plurality of icons are placed on the screen by a user repeating selection of a desired icon from various icons previously displayed in an unillustrated region within the screen and placement of the icon at a desired position.

As illustrated in FIG. 9, a combination of the shape, the pattern, and the outer frame (single or double) of an icon is varied according to a function of an associated processing engine. With regard to an image processing engine in particular, a combination of the shape, the pattern, and the outer frame (single or double) is varied for each function of the image processing engine.

Thus, a user can visually recognize the difference between icons and generate an analysis configuration by at least one of the shape, the color, the pattern, the outline style (such as the thickness of the line, the number of lines, or the color of the line) of an icon being varied according to a function of an associated processing engine. Accordingly, a suitable analysis configuration can be easily generated.

Further, a dotted rectangle included in each icon illustrated in FIG. 9 indicates a setting field of a parameter set to the icon. Since a parameter of an icon placed in Step S201 is not yet set, every setting field in FIG. 9 is blank. Note that it is apparent that an appropriate initial value may be set.

The connection unit 110 accepts a connection instruction for icons placed on the screen from the input unit 103 (Step S202).

Figure 10:
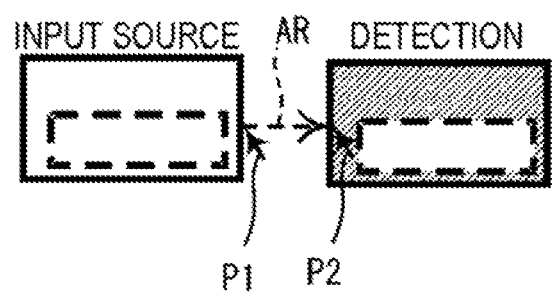
FIG. 10 is a diagram illustrating an example of a connection instruction.

For example, when a connection instruction for an input source icon and a detection icon is given by using a mouse as the input unit 103, the starting point of the connection relation is set by locating a pointer displayed on the screen at a pointer position P1 and performing a predetermined operation, as illustrated in FIG. 10. The pointer position P1 is a position of the pointer pointing to the outer edge of the input source icon.

Then, the ending point of the connection relation is set by locating the pointer at a pointer position P2 and performing a predetermined operation. The pointer position P2 is a position of the pointer pointing to the outer edge of the detection icon.

The data flow setting unit 111 sets a flow of data between the icons in accordance with the connection instruction accepted in Step S202 and displays the flow on the screen (Step S203).

Figure 11:
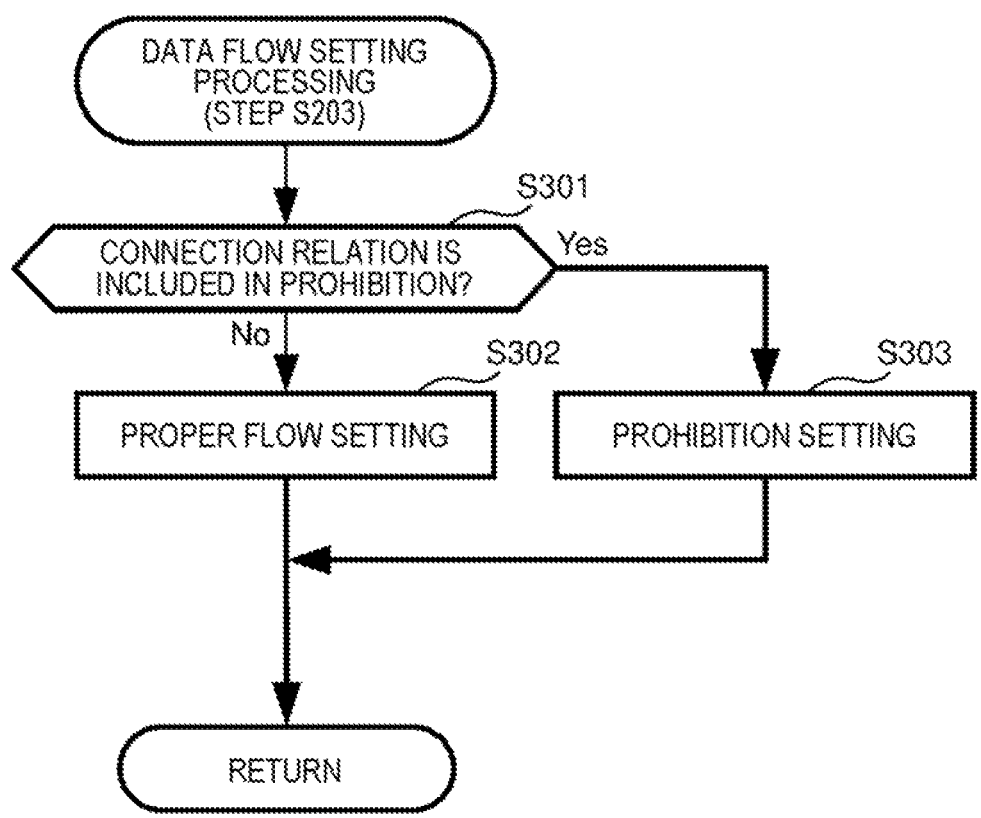
FIG. 11 is a flowchart illustrating an example of data flow setting processing according to the example embodiment.

More specifically, as described in FIG. 11, the prohibition processing unit 116 determines whether the connection relation an instruction about which is given in Step S202 is included in a prohibition (Step S301).

When the connection relation is determined not to be included in the prohibition (Step S301: No), the proper flow setting unit 118 sets a connection relation indicating a flow of data between the icons in accordance with the connection relation an instruction about which is given in Step S202 and displays the relation on a set screen (proper flow setting processing: Step S302).

A flow of data between icons is related to a flow of data between processing engines associated with the icons.

For example, a flow of data based on the aforementioned connection instruction described above with reference to FIG. 10, that is, a flow of image data being output from an input engine and being input to a detection engine is normal and therefore is assumed not to be included in the prohibition.

Figure 12:
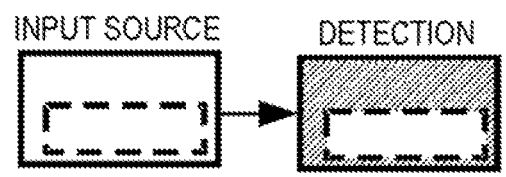
FIG. 12 is a diagram illustrating an example of a connection relation between icons, the relation being set in accordance with the connection instruction illustrated in FIG. 10.

In this case, the prohibition processing unit 116 determines that the connection relation is not included in the prohibition, and the proper flow setting unit 118 connects the icons by an arrow directed from the input source icon to the detection icon in accordance with the accepted connection instruction, as illustrated in FIG. 12. Specifically, the direction of the arrow connecting the icons is related to a direction in which image data flow between processing engines related to the icons connected by the arrow.

When determining that the connection configuration is included in the prohibition (Step S301: Yes), the prohibition processing unit 116 performs predetermined prohibition processing according to the prohibition under which the connection relation an instruction about which is given in Step S202 falls (Step S303).

Figure 13:
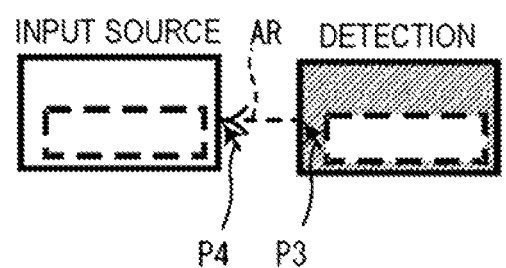
FIG. 13 is a diagram illustrating an example of a connection instruction included in a prohibition.

For example, it is assumed that a connection instruction as illustrated in FIG. 13, that is, a connection instruction with a pointer position P3 pointing to the outer edge of a detection icon as the starting point and a pointer position P4 pointing to the outer edge of an input source icon as the ending point is accepted in Step 202. According to the connection instruction, the icons are connected by an arrow directed from the detection icon to the input source icon.

However, processing of inputting image data to an input engine is not normally performed. Therefore, it is assumed that a connection instruction setting an arrow directed to an input icon, that is, a connection instruction with the outer edge of an input icon as the ending point is included in the prohibition.

Figure 14A:
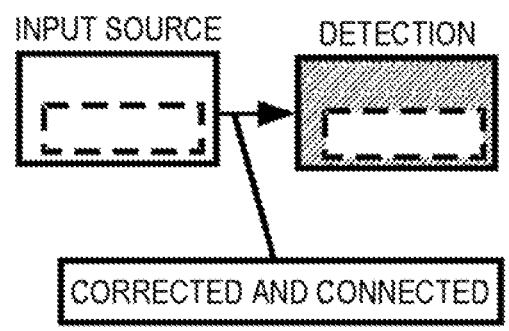
FIG. 14A is a diagram illustrating a first example of prohibition processing.
Figure 14B:
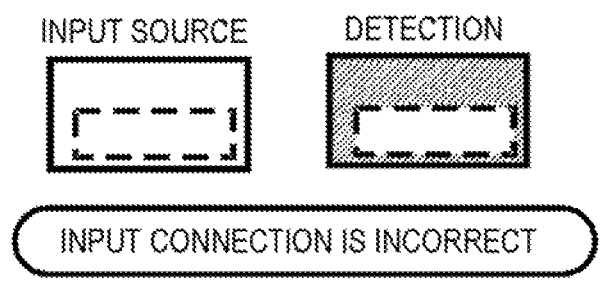
FIG. 14B is a diagram illustrating a second example of the prohibition processing.

In such a case, for example, the prohibition processing unit 116 performs prohibition processing illustrated in FIG. 14A or FIG. 14B.

FIG. 14A illustrates a first example of prohibition processing and illustrates an example of prohibition processing of setting a connection relation acquired by correcting an accepted connection instruction by a predetermined method, displaying the corrected connection relation on the screen, and making notification, by a screen display, that the connection instruction is corrected. Since an input source icon is normally the starting point of an arrow, a connection relation corrected by interchanging the starting point and the ending point that are related to the accepted connection instruction is set.

FIG. 14B illustrates a second example of prohibition processing and illustrates an example of prohibition processing of making notification, by a screen display, that a connection between icons related to the connection instruction is prohibited, without setting a connection instruction.

Performing such prohibition processing reduces the possibility that a person unfamiliar with generation of an analysis configuration or a non-engineer cannot generate a suitable analysis configuration due to incorrectly connecting icons. Accordingly, easy generation of a suitable analysis configuration is enabled.

Figure 15:
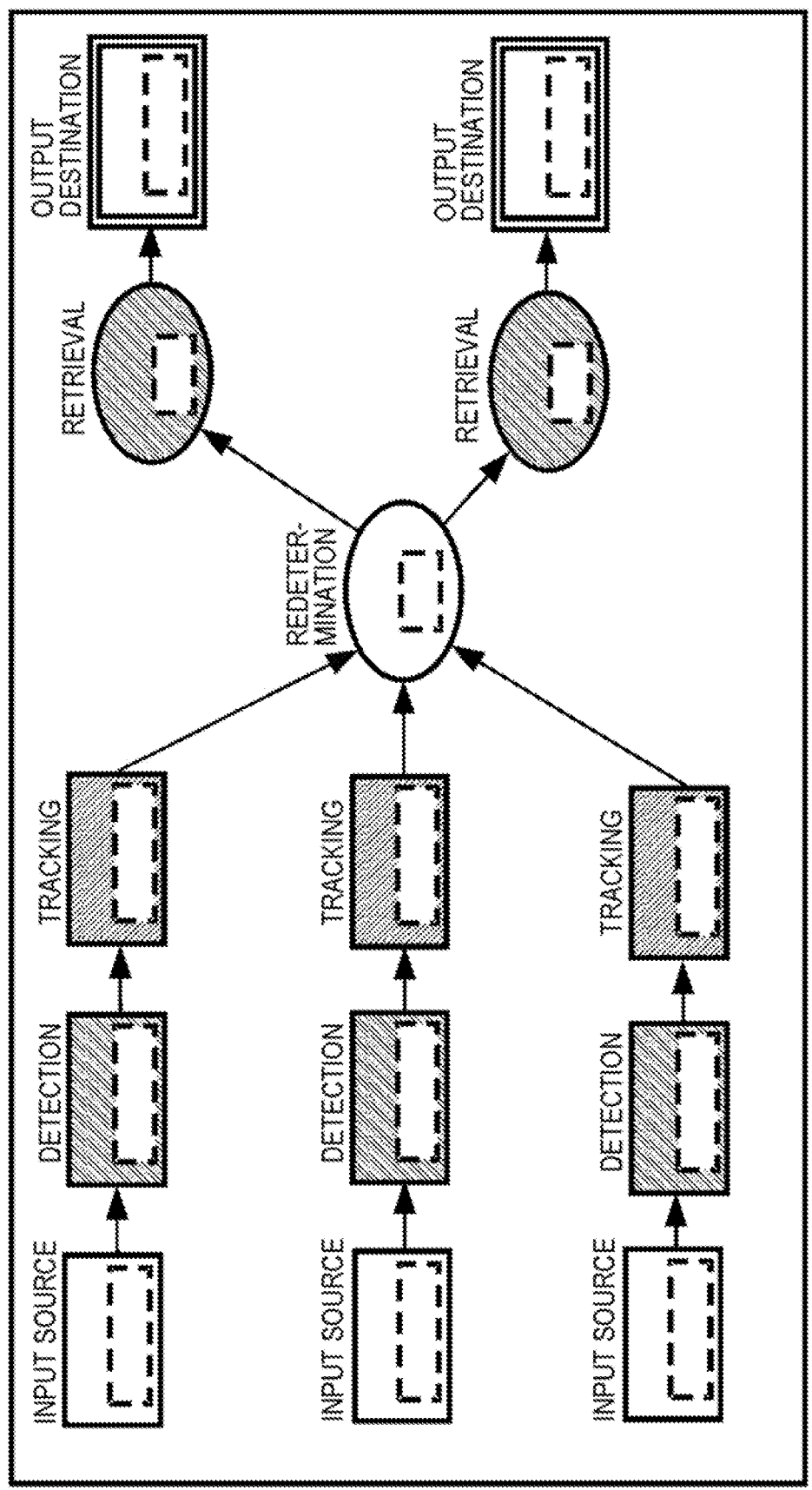
FIG. 15 is a diagram illustrating an example of a connection relation being displayed on a screen and illustrates an example of the connection relation set to the plurality of icons illustrated in FIG. 9 being displayed on the screen.

By repeating such data flow setting processing (Step S203) on each pair of desired icons out of a plurality of icons placed on the screen, a plurality of connection relations between icons as illustrated in FIG. 15 are set and are displayed on the screen.

Note that an example of setting all connection relations between a plurality of icons after all of the plurality of icons are placed and parameter setting of every icon is sequentially performed has been described. However, placement, connection, and parameter setting of icons may be performed in an appropriate order, an example of which being performing placement and connection relation setting of part of icons, then repeating placement and connection relation setting of other icons, and subsequently performing parameter setting.

FIG. 8 is referred to again.

The parameter setting unit 112 accepts a set value of a parameter associated with each icon placed on the screen in Step S201 and sets the accepted set value to the icon (Step S204).

Note that when an icon associated with a processing engine not requiring a parameter exists among the icons placed on the screen, the processing in Step S204 does not need to be performed on such an icon.

Figure 16A:
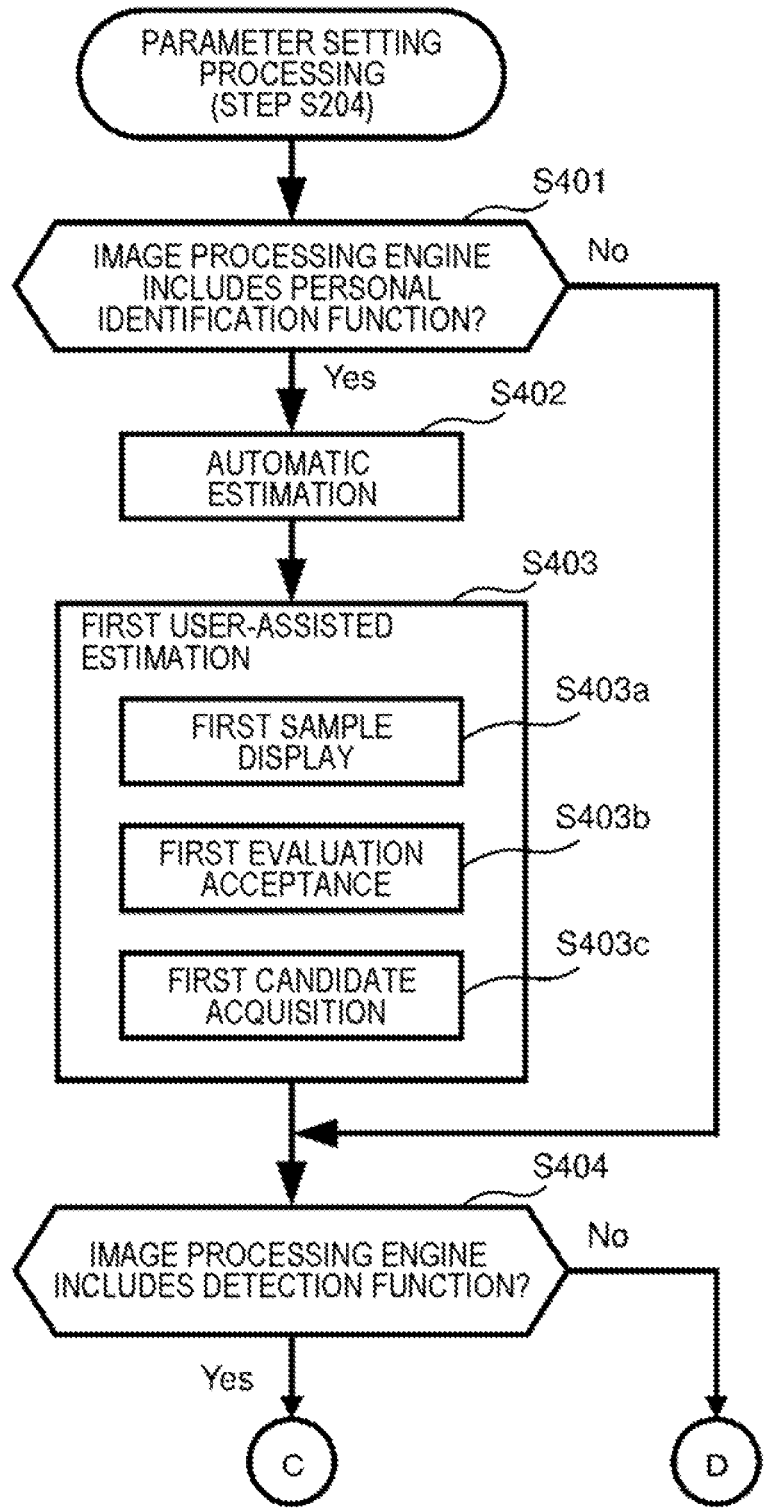
FIG. 16A is a flowchart illustrating an example of parameter setting processing according to the example embodiment.
Figure 16B:
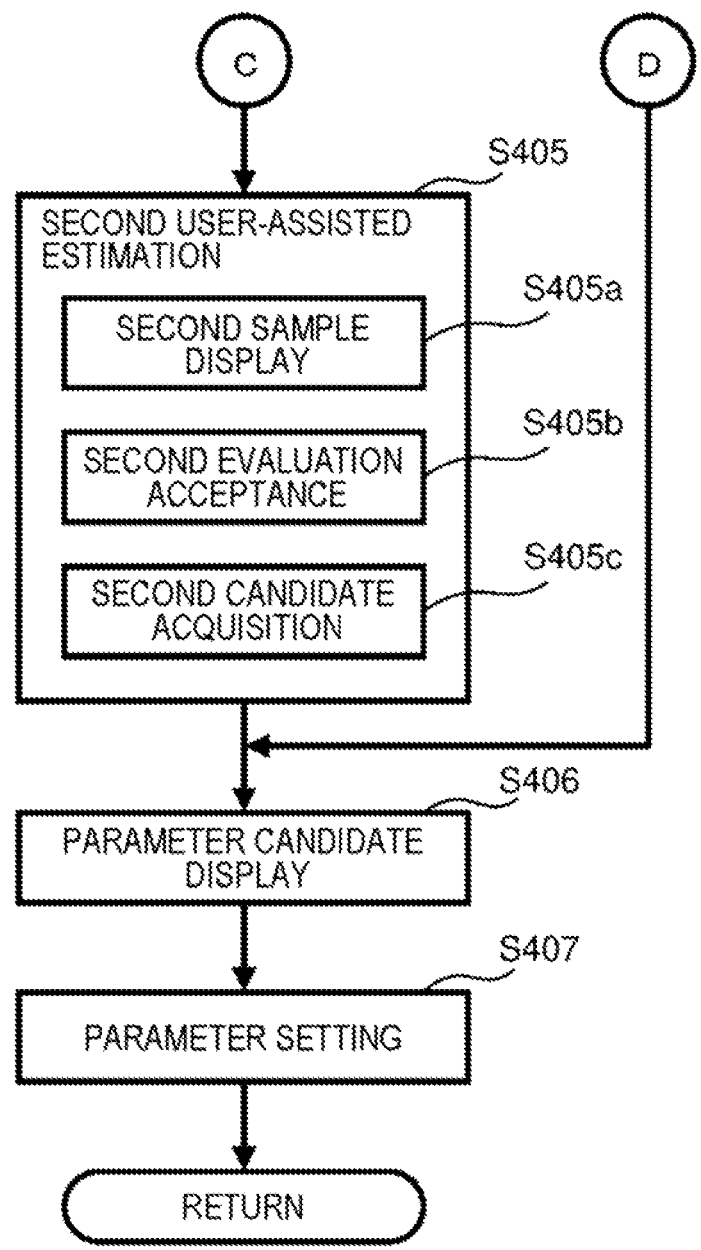
FIG. 16B is a flowchart illustrating the example of the parameter setting processing according to the example embodiment.

FIGS. 16A and 16B illustrate a detailed example of the parameter setting processing.

As described in FIG. 16A, when an image processing icon placed on the screen is selected, the automatic estimation unit 122 determines whether an image processing engine associated with the selected image processing icon includes a personal identification function (Step S401).

The personal identification function is a function of identifying a person from an image.

For example, a person-detecting engine being a type of detection engine detects a person from an image. The detection normally requires distinction between different persons in an image, and therefore a person-detecting engine includes the personal identification function. Further, for example, a specific-person-retrieving engine retrieves a specific person from an image and therefore includes the personal identification function. Furthermore, for example, a redetermination engine redetermining a person moving across a plurality of pieces of image data retrieves the person from the images and therefore includes the personal identification function.

When determining that the personal identification function is included (Step S401: Yes), the automatic estimation unit 122 acquires image data through the image acquisition unit 106 and performs automatic estimation processing on a frame image included in the acquired image data (Step S402).

The automatic estimation processing is processing of automatically estimating a candidate of a parameter; and image data referred to at this time have only to include at least one frame image. When the image data represent a dynamic image, the frame image is each static image constituting the dynamic image, and when the image data represent a static image, the frame image is the static image.

In the automatic estimation processing, for example, a value or a numeric value range of a parameter not causing a plurality of persons to be identified as identical in each frame image is found as a candidate of a parameter for a processing engine associated with the icon selected in Step S401.

Specifically, the automatic estimation unit 122 finds a candidate of a parameter for a processing engine related to the icon selected in Step S401 in such a way that all persons included in a frame image are analyzed to be different persons in processing by the processing engine.

Subsequently, the user-assisted estimation unit 123 performs first user-assisted estimation processing (Step S403).

Specifically, the sample display unit 124 controls an image processing engine associated with the image processing icon selected in Step S401. At this time, the sample display unit 124 applies the candidate of the parameter found in Step S402. Then, the sample display unit 124 causes the image processing engine to select sample images and displays the selected sample images on the screen (first sample display processing: Step S403a).

The sample images are different frame images analyzed to include an identical person among frame images included in the image data acquired in Step S402, and the number of frame images selected at this time has only to be two or more.

Note that a sample image may be an image acquired by enlarging a part of a person analyzed to be identical or the vicinity thereof in a plurality of frame images.

The evaluation acceptance unit 125 accepts a user evaluation of the sample images displayed in Step S403a from the input unit 103 (first evaluation acceptance processing: Step S403b).

For example, a user refers to a plurality of sample images displayed in Step S403a and evaluates the sample images to be correct when persons analyzed to be identical in the plurality of sample images are actually identical and evaluates the sample images to be incorrect when the persons are actually different. Then, the user inputs, through the input unit 103, the result of such an evaluation related to whether persons included in the plurality of sample images are identical.

The candidate acquisition unit 126 finds a candidate of a set value, based on the evaluation accepted in Step S403b (first candidate acquisition processing: Step S403c).

For example, the candidate acquisition unit 126 finds a candidate in such a way that a set value of a parameter in sample images an evaluation of which being correct is accepted in Step S403b is included. Further, for example, the candidate acquisition unit 126 finds a candidate excluding a set value of a parameter in sample images an evaluation of which being incorrect is accepted in Step S403b.

As described in Step S403a, the candidate of the parameter found in Step S402 is applied to an image processing engine for finding a candidate. Therefore, a candidate found in Step S403c factors in the candidate found in Step S402.

Thus, by applying the automatic estimation processing (Step S402) and the user-assisted estimation processing (Step S403) estimating a candidate by receiving user assistance to a common processing engine, a more suitable candidate can be narrowed down and found.

Note that a candidate found by the automatic estimation processing (Step S402) and a candidate found by the user-assisted estimation processing (Step S403) of estimating a candidate by receiving user assistance may be independently found and may be held in the automatic estimation unit 122 and the candidate acquisition unit 126, respectively.

When the personal identification function is determined not to be included (Step S401: No) or after Step S403, the sample display unit 124 determines whether the image processing engine associated with the image processing icon selected in Step S401 includes a detection function (Step S404).

The detection function is a function of detecting a detection target from an image.

According to the present example embodiment, a candidate of a parameter for a detection engine detecting a person is found in Step S403, and therefore a detection target in Step S401 may be an object such as a bag or a pet.

When the detection function is determined to be included (Step S404: Yes), the user-assisted estimation unit 123 performs second user-assisted estimation processing as described in FIG. 16B (Step S405).

Specifically, the sample display unit 124 acquires image data through the image acquisition unit 106 and performs second sample display processing on a frame image included in the acquired image data (Step S405a).

For example, the sample display unit 124 controls the image processing engine being a determination target in Step S404 and causes the image processing engine to perform analysis for detecting a target object being a detection target on the frame image. Then, the sample display unit 124 displays a frame image including the target object detected as a result of the analysis on the screen as a sample screen.

A sample image is a frame image including a target object among frame images included in the image data acquired in Step S405a, and the number of frame images selected at this time has only to be one or more.

Note that a sample image may be an image acquired by enlarging a part analyzed to be a target object or the vicinity thereof in a frame image.

The evaluation acceptance unit 125 accepts a user evaluation of the sample image displayed in Step S405a from the input unit 103 (second evaluation acceptance processing: Step S405b).

For example, a user refers to the sample image displayed in Step S405a and evaluates the sample image to be correct when a target object indicated to be a detection target in the sample image is actually an object falling under a target object and evaluates the sample image to be incorrect when the target object is not actually an object falling under a target object. Then, the user inputs, through the input unit 103, the result of the evaluation related to whether such a target object is correctly detected.

The candidate acquisition unit 126 finds a candidate of a set value, based on the evaluation accepted in Step S405b (second candidate acquisition processing: Step S405c).

For example, the candidate acquisition unit 126 finds a candidate in such a way that a set value of a parameter in a sample image an evaluation of which being correct is accepted in Step S405b is included. Further, for example, the candidate acquisition unit 126 finds a candidate excluding a set value of a parameter in a sample image an evaluation of which being incorrect is accepted in Step S405b.

When the detection function is determined not to be included (Step S404: No) or after Step S405, the parameter candidate display unit 120 displays a candidate found in Step S402, S403, or S405 on the screen (Step S406).

Figure 17:
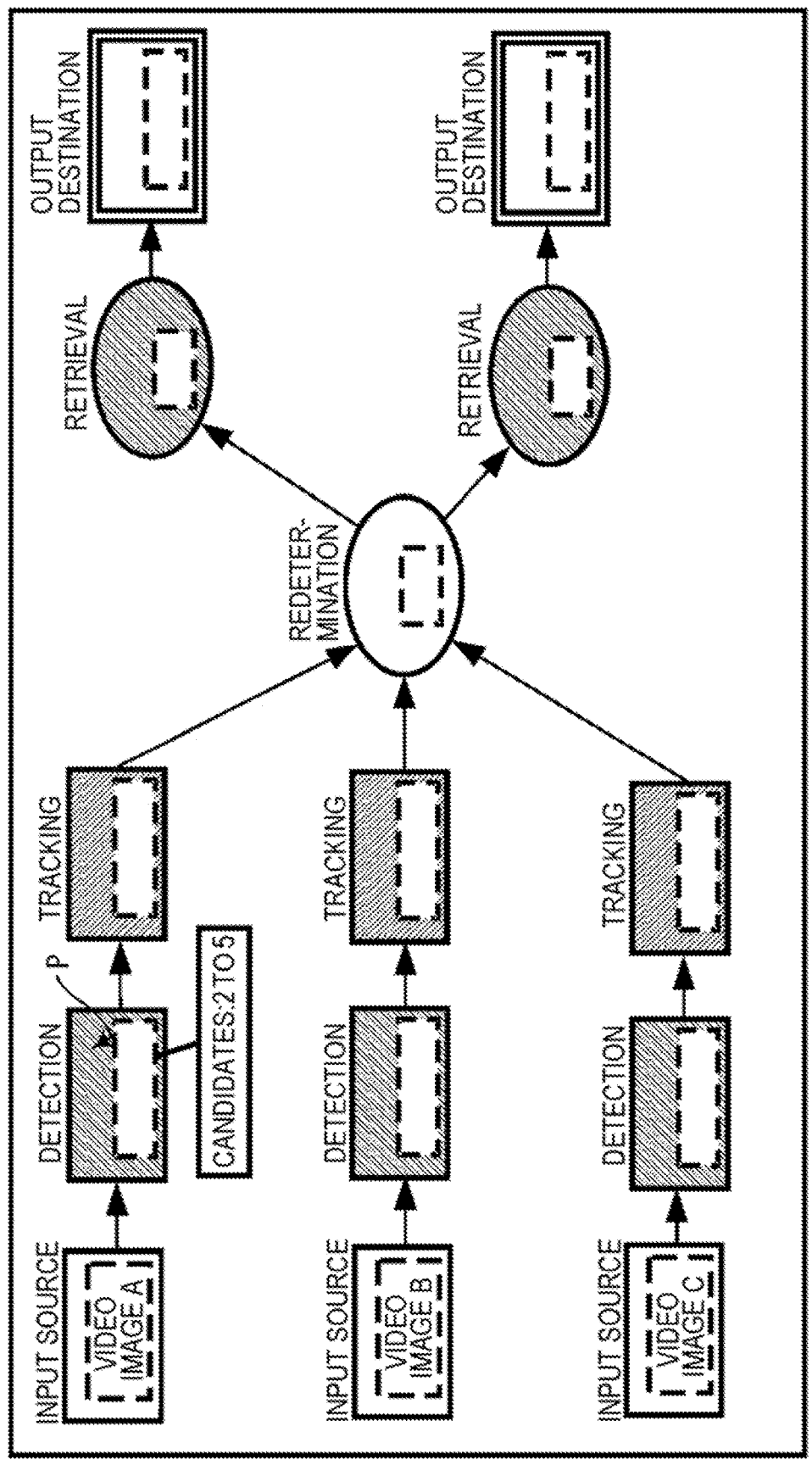
FIG. 17 is a diagram illustrating an example of candidates being displayed for a selected icon.

FIG. 17 illustrates an example of selecting a detection icon and displaying candidates of a set value for a parameter applied to a detection engine associated with the selected detection icon. For example, the detection icon is selected by pointing the icon by a pointer P and then performing a predetermined operation (such as a double click of a mouse button). As illustrated in the diagram, candidates may be displayed in association with the selected detection icon.

Further, when a candidate is found in Step S402, S403, or S405, the found candidate has only to be displayed in Step S406; and when a candidate is not found, the processing in Step S406 may be ended without display.

For example, in FIG. 17, a "video image A," a "video image B," and a "video image C" are set to three input source icons, respectively. For example, it is assumed that the video image A is an address of the camera 101a in the network and that input data are image data captured by the camera 101a. An input engine associated with an input source icon includes neither function of the personal identification function and the detection function, and therefore a candidate associated with an input source icon is not found, according to the present example embodiment. Accordingly, when a value of a parameter set to an input source icon is to be set, a candidate is not displayed in Step S406.

Note that, for example, the address of a camera 101 connected to the network may be displayed as a candidate in association with an input source icon. Further, an image actually captured by the camera 101 may be displayed on the screen as a sample image, and a set value of a parameter may be set with reference to the sample image.

The parameter acceptance unit 121 accepts and sets a set value of a parameter associated with each icon placed on the screen (Step S407).

Figure 18:
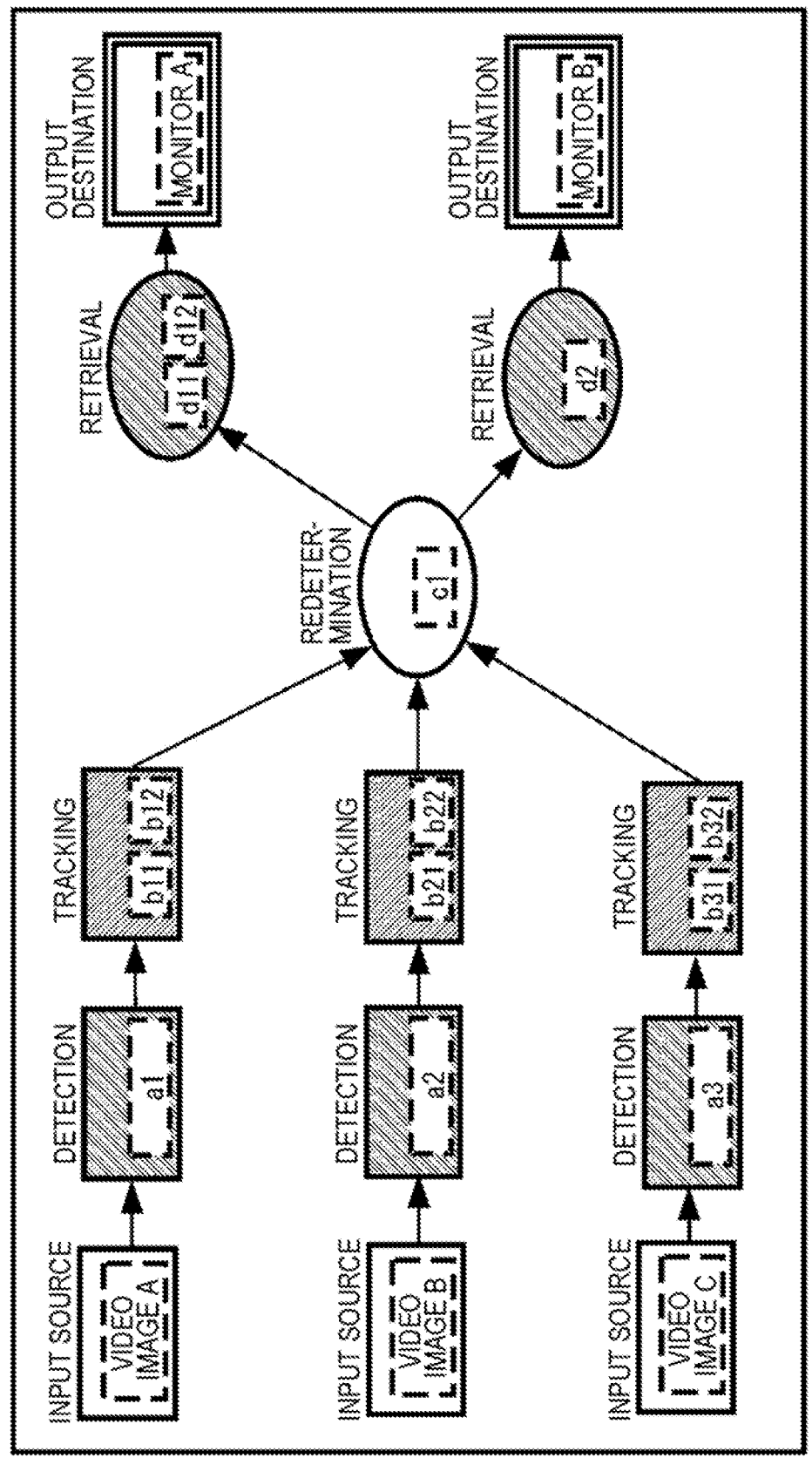
FIG. 18 is a diagram illustrating an example of set values of parameters for all icons being set.

For example, the parameter acceptance unit 121 accepts a value input to a setting field of each icon as a set value and holds the set value in association with the icon, as illustrated in FIG. 18. A set value associated with an icon is a set value of a parameter applied to a processing engine related to the icon.

An example of one parameter being applied to each of various processing engines is described in the present example embodiment. However, in the example illustrated in FIG. 18, two set values are set to each tracking icon (for example, two set values "b11" and "b12" are set to the uppermost tracking icon in FIG. 18). Further, two set values are also set to one of the retrieval engines (the upper retrieval icon in FIG. 18). Thus, a plurality of set values may be set to a parameter required for processing in a processing engine. Usage of a plurality of set values set as described above will be described later.

When a candidate is displayed, a user can set a parameter with reference to the candidate and therefore can easily set a suitable parameter. Accordingly, a suitable analysis configuration can be generated easily.

FIG. 7A is referred to again.

The analysis unit 113 determines whether an instruction to start analysis is accepted (Step S102).

When an instruction to start analysis is determined not to be accepted (Step S102: No), the previously described analysis configuration generation processing (Step S101) continues to be executed.

When an instruction to start analysis is determined to be accepted, the analysis unit 113 repeats the processing in Step S104 to S110 for every group of set values (Step S103).

Note that 14 icons are placed in the example of the analysis configuration illustrated in FIG. 18, and as described above, a set value of one parameter is set for every processing engine, according to the present example embodiment. Therefore, in the example of the analysis configuration illustrated in FIG. 18, a group of set values is constituted of 14 set values associated with the respective icons.

Then, in the example of the analysis configuration illustrated in FIG. 18, two different set values are set to each of the three tracking icons and the one retrieval icon, as described above. Therefore, in the example of the analysis configuration illustrated in FIG. 18, 16 ($=2^4$) groups of set values are set. Analysis processing is performed on every such group of set values by the processing in Step S103.

The analysis execution unit 127 acquires image data being a target of analysis through the image acquisition unit 106 and executes the analysis processing in accordance with the analysis configuration generated in Step S101 (Step S104).

Specifically, the analysis execution unit 127 acquires a processing engine related to an icon placed on the screen, based on processing engine data, and causes the processing engine to execute processing. The analysis execution unit 127 holds image data being the processing result, acquires a processing engine related to the next icon connected by the connection relation, and causes the acquired processing engine to execute processing on the held image data. Such processing is executed in accordance with the analysis configuration.

The abnormality prediction unit 128 determines whether occurrence of an abnormality is predicted in the result of the analysis processing by the analysis execution unit 127 (Step S105).

For example, an appropriate processing unit is preset to processing of each processing engine, and the abnormality prediction unit 128 determines whether occurrence of an abnormality is predicted every time the processing unit of processing ends in Step S103.

When occurrence of an abnormality is determined not to be predicted (Step S105: No), the analysis execution unit 127 determines whether the analysis processing for one group of set values is ended (Step S106).

When the analysis processing is determined not to be ended for the one group of set value (Step S106: No), the analysis execution unit 127 continues to execute the analysis processing (Step S104).

When occurrence of an abnormality is determined to be predicted (Step S105: Yes), the analysis interruption unit 129 interrupts the analysis processing, makes notification of the abnormality (Step S107), and ends the image analysis processing, as described in FIG. 7B.

The abnormality notification in Step S107 is notification for prompting change of a set value, and for example, the analysis interruption unit 129 displays, on the screen, a message that a set value for a parameter of a processing engine related to processing for which occurrence of an abnormality is predicted is to be changed. At this time, the analysis interruption unit 129 may display, on the screen, an image in which occurrence of an abnormality is predicted.

For example, an abnormality predicted by the abnormality prediction unit 128 refers to, when an image processing engine running in Step S104 includes the personal identification function, a plurality of persons being analyzed to be identical persons in a frame image by the image processing engine.

Further, examples of such an abnormality include, when an image processing engine running in Step S104 is a redetermination engine, the number of persons analyzed to be identical persons among a plurality of pieces of image data being less than a threshold value and a person who is to be consecutively detected across a plurality of pieces of image data not being detected.

By performing such abnormality notification processing based on prediction of abnormality occurrence (Step S107), a user can examine whether a configuration of a processing engine, a set value of a parameter, and the like are suitable before the analysis processing completes for every combination. Thus, the configuration of the processing engine, the set value of the parameter, and the like can be corrected before the analysis processing is completed for every combination. Accordingly, generation of a suitable analysis configuration and parameter setting can be promptly performed.

Note that the analysis interruption unit 129 may not forcibly end the image analysis processing after the notification in Step S107 and may select between ending and continuation of the image analysis processing in accordance with an instruction from the input unit 103.

FIG. 7A is referred to again.

When analysis processing on one group of set values is determined to be ended (Step S106: Yes), the abnormality detection unit 130 determines whether an abnormality is included in a result of the analysis processing by the analysis execution unit 127 applied with the group of set values, as described in FIG. 7B (Step S108).

When an abnormality is determined to be included (Step S108: Yes), the abnormality notification unit 131 interrupts the analysis processing, makes notification of the abnormality (Step S109), and ends the image analysis processing.

The abnormality notification in Step S109 is notification for prompting change of a set value, and for example, the abnormality notification unit 131 displays, on the screen, a message that a set value for a parameter of a processing engine related to an image determined to include an abnormality is to be changed. At this time, the abnormality notification unit 131 may display the image determined to include the abnormality on the screen.

For example, an abnormality detected by the abnormality notification unit 131 refers to, when an image processing engine including the personal identification function is included in the analysis configuration executed in Step S104, a plurality of persons being analyzed to be identical persons in a frame image included in the analysis result.

Further, examples of such abnormality include, when the analysis configuration includes a redetermination engine, the number of persons analyzed to be identical persons in an analysis result being less than a threshold value and a person who is to be consecutively detected in an analysis result not being detected.

By performing such abnormality notification processing based on abnormality detection (Step S109), a user can examine whether a configuration of a processing engine, a set value of a parameter, and the like are suitable before analysis processing for every combination is completed. Thus, a configuration of a processing engine, a set value of a parameter, and the like can be corrected before analysis processing for every combination is completed. Accordingly, suitable generation of an analysis configuration and suitable parameter setting can be promptly performed.

Note that the abnormality notification unit 131 may not forcibly end the image analysis processing after the notification in Step S109 and may select between ending and continuation of the image analysis processing in accordance with an instruction from the input unit 103.

When an abnormality is determined to be not included (Step S108: No), the result output unit 132 displays the result of the analysis processing on the screen (Step S110).

An example of the processing result is a screen presenting the inside of the store S as illustrated in FIG. 2 viewed from above and indicating a moving route of each of the customers A to C, the route being retrieved under a predetermined condition.

As described in FIGS. 7A and 7B, Step S110 is performed every time analysis processing ends for one group of set values, and therefore a user can examine whether a result of analysis processing for each group of set values is suitable.

When the result of analysis processing is determined to be unsuitable as a result of examination, a configuration of a processing engine, a set value of a parameter, and the like can be corrected before analysis processing for every combination is completed. Further, when the result of analysis processing is determined to be suitable as a result of examination, a configuration of a processing engine, a set value of a parameter, and the like can be determined before analysis processing for every combination is completed. Accordingly, suitable generation of an analysis configuration and suitable parameter setting can be promptly performed.

Note that there are cases in which the image analysis processing can be continued in accordance with an instruction from the input unit 103 and the analysis processing can be ended even when occurrence of an abnormality is predicted (Step S105: Yes) or an abnormality is detected (Step S108: Yes). In such a case, the result output unit 132 may display the result of the analysis processing on the screen.

The analysis execution unit 127 successively executes the processing in Steps S104 to S110 for different groups of set values and when completing the processing in Steps S104 to S110 for every group of set values, ends the image analysis processing.

Component Generation Processing According to Present Example Embodiment

From here onward, component generation processing according to the present example embodiment will be described with reference to diagrams.

Figure 19:
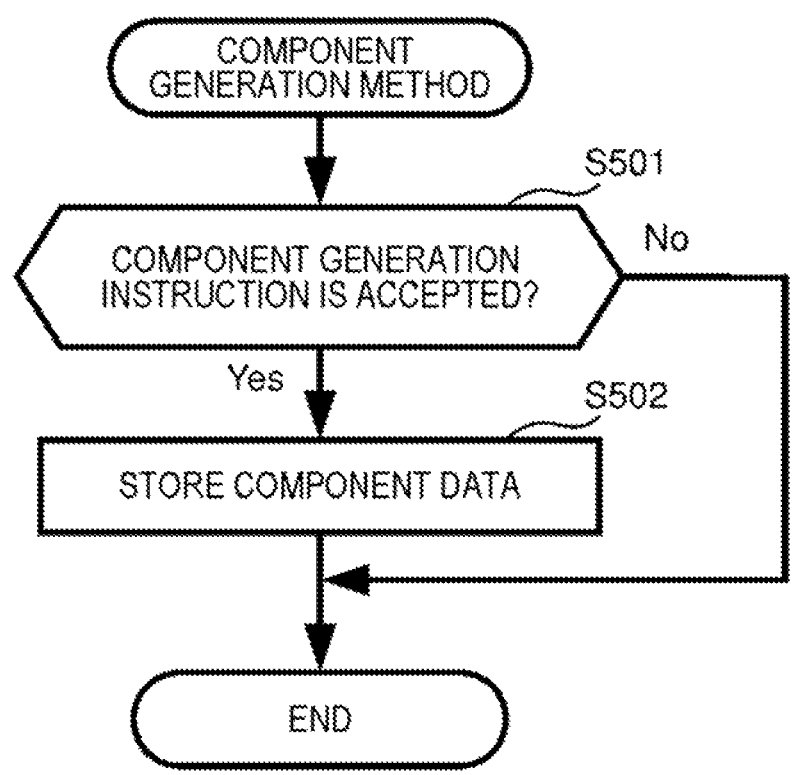
FIG. 19 is a flowchart illustrating an example of component generation processing according to the example embodiment of the present invention.

FIG. 19 is a flowchart illustrating an example of the component generation processing according to the present example embodiment. The component generation processing is executed during or after generation of an analysis configuration.

The component generation unit 114 determines whether a component generation instruction is accepted (Step S501).

A component generation instruction is an instruction to select an icon group and a connection relation that are included in a component and generate a component including the selected icon group and the selected connection relation. For example, the component generation unit 114 accepts a component generation instruction, based on an operation of the input unit 103 by a user.

Figure 20:
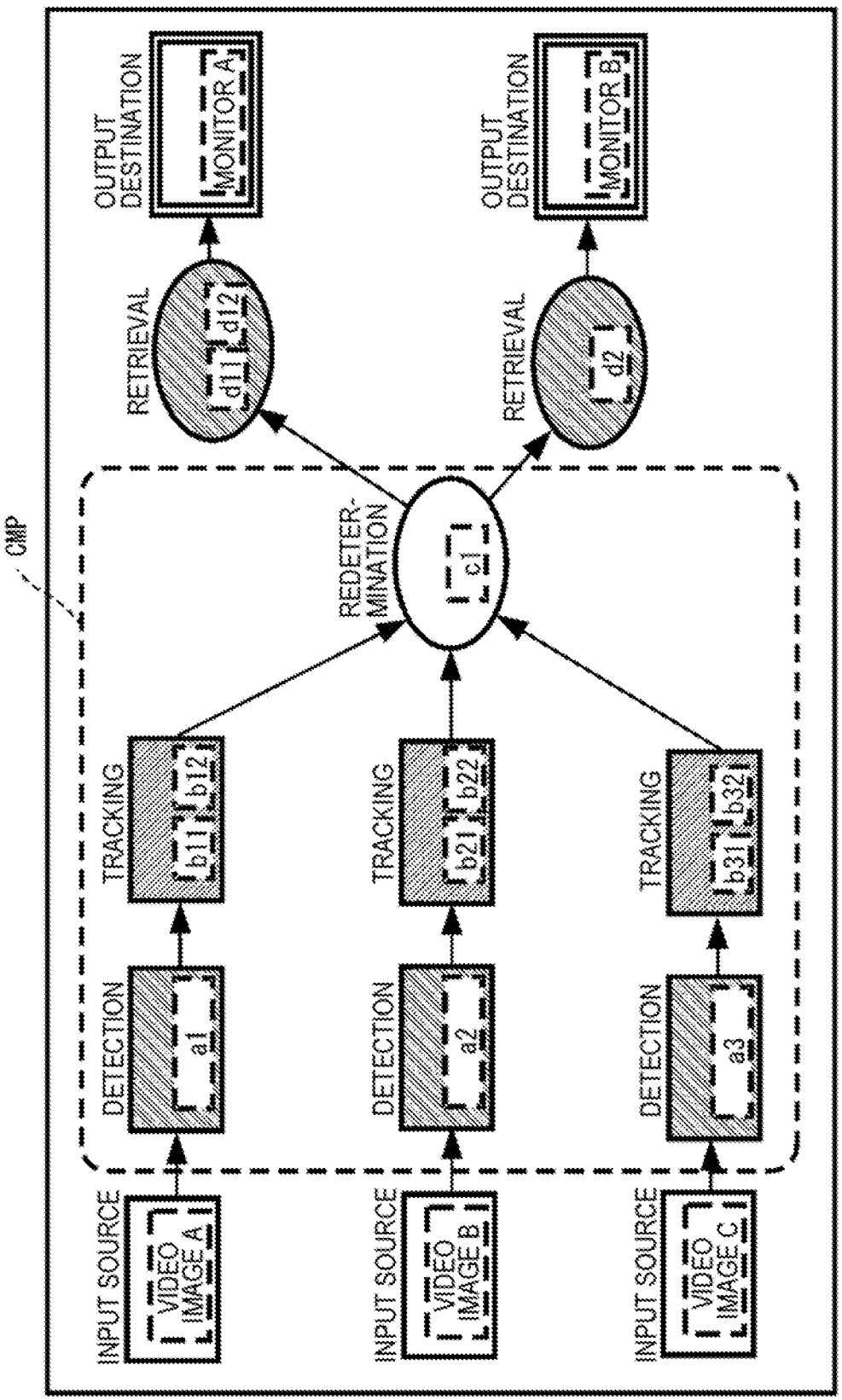
FIG. 20 is a diagram illustrating an example of selecting an icon group as a component.

FIG. 20 illustrates an example of an icon group and a connection relation that are enclosed by a dotted rectangle CMP being selected from the analysis configuration illustrated in FIG. 18.

When determining that a component generation instruction is not accepted (Step S501: No), the component generation unit 114 ends the component generation processing.

When determining that a component generation instruction is accepted (Step S501: Yes), the component generation unit 114 causes the component storage unit 115 to store component data (Step S502) and ends the component generation processing.

Component data are data indicating a component constituted of an icon group and a connection relation that are related to the component generation instruction accepted in Step S501 and information for identifying the component in association with each other.

Figure 21:
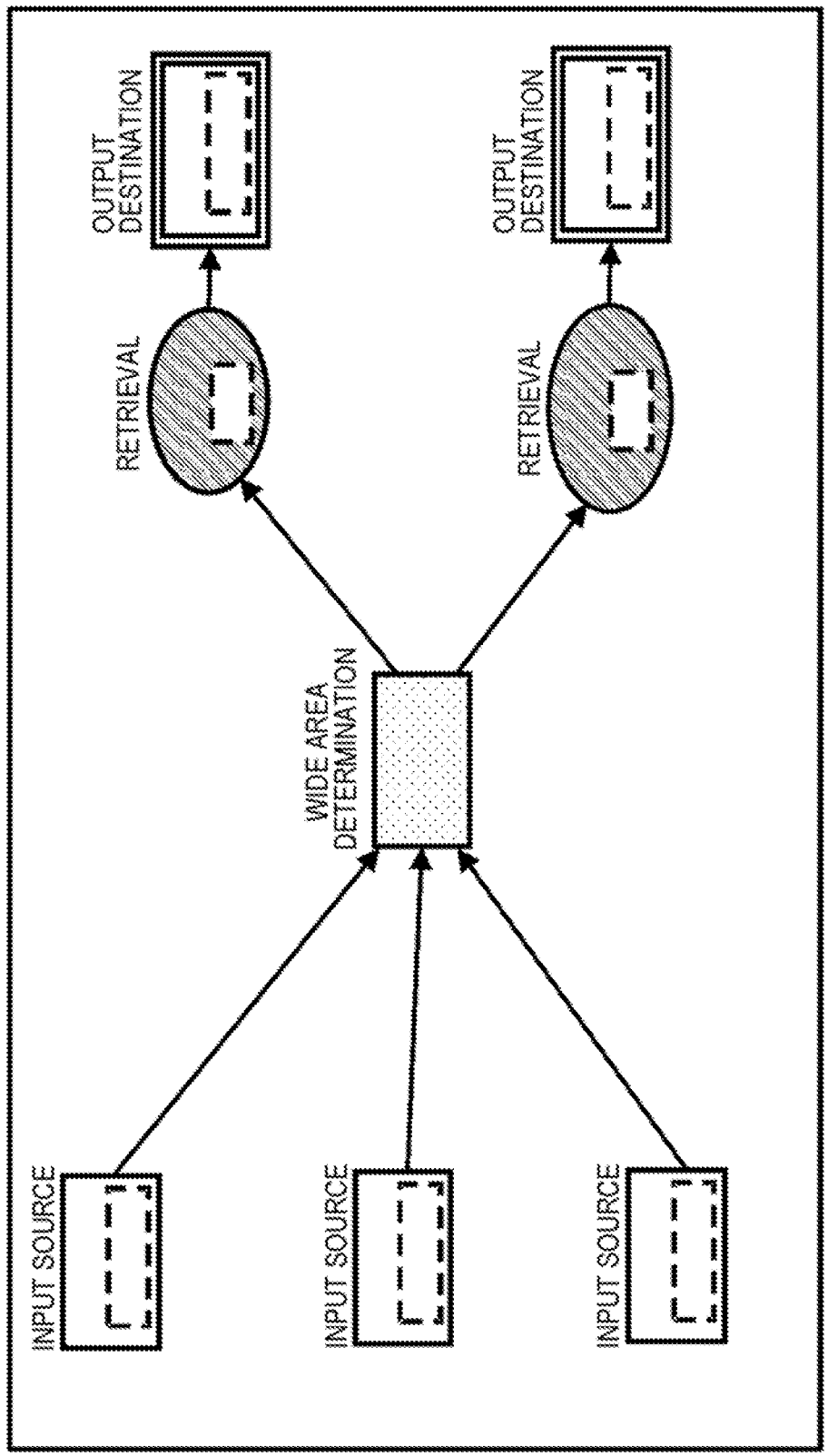
FIG. 21 is a diagram illustrating an example of generating an analysis configuration by using a component.

By generating such a component, the icon placement unit 107 can place a component included in component data similarly to an icon. FIG. 21 illustrates an example of the component selected in FIG. 20 being placed on the screen for generating an analysis configuration as a component "wide area determination." In other words, details of the analysis configuration illustrated in FIG. 21 are identical to those of the analysis configuration illustrated in FIG. 15.

By thus generating a component, a new analysis configuration can be generated by easily reusing part or all of a suitable analysis configuration. Accordingly, generation of a suitable analysis configuration can be easily performed.

Note that while an example of a component being assumed to be constituted of an icon group and a connection relation and not including a set value of a parameter has been described in the present example embodiment, a component may further include a set value of a parameter.

The example embodiment of the present invention has been described above.

According to the present example embodiment, a plurality of icons including a plurality of input source icons, a plurality of image processing icons, and at least one output destination icon are placed on the screen by the icon placement unit 107 in accordance with an instruction for placement on the screen. Then, when the connection unit 110 accepts a connection instruction, a flow of data between icons is set in accordance with the connection instruction and is displayed on the screen.

Thus, a user can generate an analysis configuration (in other words, configure the entire analysis processing of image data) while recognizing details of the analysis processing of the image data with a screen display. Accordingly, suitable configuration of the entire analysis processing of the image data can be easily performed.

While the example embodiments of the present invention and the modified examples thereof have been described above, the present invention is not limited to these example embodiments and modified examples. For example, example embodiments acquired by combining part or all of the example embodiments and the modified examples thereof that are described above, and example embodiments with changes to such example embodiments are also included in the present invention.

Part or all of the means in the example embodiments disclosed above may also be described as, but not limited to, the following supplementary notes.

1. An image analysis apparatus including:
   an icon placement means for accepting an instruction for placing, on a screen, a plurality of icons including a plurality of input source icons each indicating an input source of image data being a target of analysis, a plurality of image processing icons each indicating an image processing engine for the image data, and at least one output destination icon indicating an output destination of a processing result by an image processing engine, and placing the plurality of icons on a screen in accordance with the instruction;

a connection means for accepting a connection instruction for connecting icons placed on the screen; and a data flow setting means for setting a flow of data between the icons in accordance with the connection instruction and displaying the flow on the screen.

2. The image analysis apparatus according to aforementioned 1, further including a parameter setting means for, when an image processing icon placed on the screen is selected, accepting a set value for a parameter applied to the image processing engine related to the selected image processing icon.

3. The image analysis apparatus according to aforementioned 2, wherein the parameter setting means includes:
a parameter estimation means for, when an image processing icon placed on the screen is selected, finding a candidate of a set value for the parameter applied to the image processing engine related to the selected image processing icon, based on at least part of the image data;
a parameter candidate display means for displaying the found candidate on the screen; and
a parameter acceptance means for accepting the set value of the parameter.

4. The image analysis apparatus according to aforementioned 3, wherein, when an image processing icon placed on the screen is selected and an image processing engine associated with the selected image processing icon includes a function of identifying a person, the parameter estimation means finds a candidate of the set value in such a way that all of one or more persons included in a frame image constituting at least part of the image data are analyzed to be different persons in processing by the image processing engine.

5. The image analysis apparatus according to aforementioned 3 or 4, wherein the parameter estimation means includes:
a sample display means for, when an image processing icon placed on the screen is selected, displaying, on the screen, one or a plurality of sample images acquired by executing processing by an image processing engine associated with the selected image processing icon on at least part of the image data;
an evaluation acceptance means for accepting a user evaluation of the one or a plurality of sample images; and
a candidate acquisition means for finding a candidate of the set value, based on the processing result.

6. The image analysis apparatus according to aforementioned 5, wherein the sample display means displays a plurality of sample sets constituted of the one or a plurality of sample images, and
the evaluation acceptance means accepts a user evaluation of each of the plurality of sample sets.

7. The image analysis apparatus according to aforementioned 6, wherein, when an image processing icon placed on the screen is selected and an image processing engine associated with the selected image processing icon includes a function of detecting a detection target included in the image data, the sample display means displays the one or a plurality of sample images indicating the detected detection target, and
the evaluation acceptance means accepts, as the evaluation, whether the detection target is correctly detected in the one or a plurality of sample images.

8. The image analysis apparatus according to aforementioned 6 or 7, wherein, when an image processing icon placed on the screen is selected and an image processing engine associated with the selected image processing icon includes a function of identifying a person, the sample display means displays a plurality of the sample images each including a person, and
the evaluation acceptance means accepts, as the evaluation, whether persons included in the plurality of sample images are identical.

9. The image analysis apparatus according to any one of aforementioned 2 to 8, further including an analysis means for executing, on the image data, analysis processing based on a plurality of icons placed on the screen and a connection relation between the plurality of icons, wherein
the parameter setting means accepts a plurality of groups of one or more set values constituted of a set value associated with each of a plurality of icons placed on the screen, and,
for each group of the set values, the analysis means executes analysis processing on the image data in accordance with a connection relation between a plurality of icons placed on the screen.

10. The image analysis apparatus according to aforementioned 9, wherein, for each group of the set values, every time analysis processing on the image data ends in accordance with a connection relation between a plurality of icons placed on the screen, the analysis means displays a result of the analysis processing on the screen.

11. The image analysis apparatus according to aforementioned 9 or 10, wherein the analysis means includes:
an abnormality prediction means for predicting whether an abnormality occurs in a result of the analysis processing; and
an analysis interruption means for making notification for prompting change of the set value when the abnormality is predicted to occur.

12. The image analysis apparatus according to any one of aforementioned 9 to 11, wherein the analysis means includes:
an abnormality detection means for determining whether an abnormality is included in a result of the analysis processing; and
an abnormality notification means for making notification for prompting change of the set value when the abnormality is determined to be included.

13. The image analysis apparatus according to aforementioned 11 or 12, wherein the abnormality is at least one item out of:
when an image processing engine associated with an image processing icon placed on the screen includes a function of identifying a person, a plurality of persons included in a frame image constituting the image data being analyzed to be identical persons; and when an image processing engine associated with an image processing icon placed on the screen includes a function of identifying a person and a target of the analysis is a plurality of pieces of image data acquired by capturing images of different regions in a continuous space, a number of one or more persons analyzed to be identical persons among the plurality of pieces of image data being less than a threshold value.

14. The image analysis apparatus according to any one of aforementioned 1 to 13, further including
a component generation means for accepting selection of part or all of a plurality of icons placed and connected on the screen and holding as a component, the selected plurality of icons and a connection relation between the plurality of icons.

15. The image analysis apparatus according to any one of aforementioned 1 to 14, wherein
the image processing icons include at least one of:
a detection icon associated with a detection engine being an image processing engine for detecting a detection target from image data;
a tracking icon associated with a tracking engine being an image processing engine for tracking a tracking target in image data;
a feature value extraction icon associated with a feature value extraction engine being an image processing engine for extracting a feature value in image data;
a retrieval icon associated with a retrieval engine being an image processing engine for retrieving a retrieval target from image data; and
a redetermination icon associated with a redetermination engine being an image processing engine for tracking a tracking target across a plurality of pieces of image data.

16. The image analysis apparatus according to any one of aforementioned 1 to 15, wherein
the data flow setting means includes:
a prohibition processing means for, when a connection instruction is accepted by the connection means, determining whether a connection between the icons related to the connection instruction is included in prohibition data indicating a prohibition related to a connection between the icons and performing prohibition processing, based on a result of determination; and
a proper flow setting means for setting a flow of data between the icons in accordance with the connection instruction and the prohibition processing and displaying the flow on the screen.

17. The image analysis apparatus according to aforementioned 16, wherein
the prohibition processing includes at least one item out of not generating a connection relation based on the connection instruction, correcting the connection instruction by a predetermined method, and making notification that a connection between the icons related to the connection instruction is prohibited.

18. The image analysis apparatus according to any one of aforementioned 1 to 17, wherein
the image processing engines include processing engines with different functions related to image processing, and
at least one of a shape, a color, a pattern, and a style of an outline of the image processing icon is varied for each function of the image processing engine.

19. An image analysis system including:
the image analysis apparatus according to any one of aforementioned 1 to 18; and
a plurality of image capture apparatuses for acquiring the image data.

20. An image analysis method including:
accepting an instruction for placing, on a screen, a plurality of icons including a plurality of input source icons each indicating an input source of image data being a target of analysis, a plurality of image processing icons each indicating an image processing engine for the image data, and at least one output destination icon indicating an output destination of a processing result by an image processing engine, and placing the plurality of icons on a screen in accordance with the instruction;
accepting a connection instruction for connecting icons placed on the screen; and
setting a flow of data between the icons in accordance with the connection instruction and displaying the flow on the screen.

21. A non-transitory storage medium storing a program for causing a computer to execute:
accepting an instruction for placing, on a screen, a plurality of icons including a plurality of input source icons each indicating an input source of image data being a target of analysis, a plurality of image processing icons each indicating an image processing engine for the image data, and at least one output destination icon indicating an output destination of a processing result by an image processing engine, and placing the plurality of icons on a screen in accordance with the instruction;
accepting a connection instruction for connecting icons placed on the screen; and
setting a flow of data between the icons in accordance with the connection instruction and displaying the flow on the screen.

REFERENCE SIGNS LIST

100 Image analysis system
101a, 101b, 101c Camera
102 Image analysis apparatus
103 Input unit
104 Display unit
105 Display control unit
106 Image acquisition unit
107 Icon placement unit
108 Icon storage unit
109 Icon-processing storage unit
110 Connection unit
111 Data flow setting unit
112 Parameter setting unit
113 Analysis unit
114 Component generation unit
115 Component storage unit
116 Prohibition processing unit
117 Prohibition storage unit
118 Proper flow setting unit
119 Parameter estimation unit
120 Parameter candidate display unit
121 Parameter acceptance unit
122 Automatic estimation unit
123 User-assisted estimation unit
124 Sample display unit
125 Evaluation acceptance unit
126 Candidate acquisition unit 127 Analysis execution unit
128 Abnormality prediction unit
129 Analysis interruption unit
130 Abnormality detection unit
131 Abnormality notification unit
132 Result output unit

What is claimed is:

1. An image analysis apparatus comprising:
at least one memory storing instructions; and
at least one processor configured to execute the instructions to:
accept an instruction for placing, on a screen, a plurality of icons, and place the plurality of icons on the screen in accordance with the instruction, the plurality of icons including a plurality of input source icons, a plurality of imaging processing icons, and at least one output destination icon, each input source icon indicating an input source of image data that is a target of analysis, each image processing icon indicating an image processing engine for the image data to generate a processing result, and each output destination icon indicating an output destination of the processing result;
accept a connection instruction for connecting specified icons that have been placed on the screen; and
set a flow of data between the specified icons in accordance with the connection instruction and display the flow on the screen, wherein
the connection instruction includes at least an instruction to connect at least one of the plurality of input source icons and the at least one output destination icon such that at least one of the plurality of image processing icons is included between the at least one of the plurality of input source icons and the at least one output destination icon.

2. The image analysis apparatus according to claim 1, wherein the at least one processor is configured to execute the instructions to:
accept, when one of the image processing icons placed on the screen is selected, a set value for a parameter applied to the image processing engine related to the selected image processing icon.

3. The image analysis apparatus according to claim 2, wherein
acceptance of the set value for the parameter includes:
finding, when the one of the image processing icons placed on the screen is selected, a candidate of a set value for the parameter applied to the image processing engine related to the selected image processing icon, based on at least part of the image data;
displaying the found candidate on the screen; and
accepting a setting of the parameter.

4. The image analysis apparatus according to claim 3, wherein
finding the candidate of the set value includes:
finding, when the one of the image processing icons placed on the screen is selected and the image processing engine associated with the selected image processing icon includes a function of identifying a person, the candidate of the set value in such a way that all of one or more persons included in a frame image constituting at least part of the image data are analyzed to be different persons via processing by the image processing engine.

5. The image analysis apparatus according to claim 3, wherein
finding the candidate of the set value includes:
displaying, on the screen, when the one of the image processing icons placed on the screen is selected, one or a plurality of sample images acquired by executing processing by the image processing engine associated with the selected image processing icon on at least part of the image data;
accepting a user evaluation of the one or the plurality of sample images; and
finding the candidate of the set value, based on the processing result.

6. The image analysis apparatus according to claim 5, wherein
displaying the one or the plurality of sample images includes displaying a plurality of sample sets constituted of the one or the plurality of sample images, and
accepting the user evaluation includes accepting a user evaluation of each of the plurality of sample sets.

7. The image analysis apparatus according to claim 6, wherein,
displaying the one or the plurality of sample images includes, when the one of the image processing icons placed on the screen is selected and the image processing engine associated with the selected image processing icon includes a function of detecting a detection target included in the image data, displaying the one or the plurality of sample images indicating the detected detection target, and
accepting the user evaluation includes accepting, as the evaluation, whether the detection target is correctly detected in the one or the plurality of sample images.

8. The image analysis apparatus according to claim 6, wherein,
displaying the one or the plurality of sample images includes displaying the plurality of the sample images that each include a person, when the one of the image processing icons placed on the screen is selected and the image processing engine associated with the selected image processing icon includes a function of identifying a person, and
accepting, as the evaluation, whether persons included in the plurality of sample images are identical.

9. The image analysis apparatus according to claim 2, wherein the at least one processor configured to execute the instructions to:
execute, on the image data, analysis processing based on the plurality of icons placed on the screen and a connection relation between the plurality of icons, wherein
accepting the set value for the parameter includes accepting a plurality of groups of one or more set values including a set value associated with each of the plurality of icons placed on the screen, and,
executing analysis processing includes executing, for each group of the set values, analysis processing on the image data in accordance with the connection relation between the plurality of icons placed on the screen.

10. The image analysis apparatus according to claim 9, wherein,
executing analysis processing includes displaying a result of the analysis processing on the screen for each group of the set values, every time analysis processing on the image data ends in accordance with the connection relation between the plurality of icons placed on the screen.

11. The image analysis apparatus according to claim 9, wherein
executing analysis processing includes:
predicting whether an abnormality occurs in a result of the analysis processing; and
providing notification for prompting change of the set value when the abnormality is predicted to occur.

12. The image analysis apparatus according to claim 9, wherein
executing analysis processing includes:
determining whether an abnormality is included in a result of the analysis processing; and
providing notification for prompting change of the set value when the abnormality is determined to be included.

13. The image analysis apparatus according to claim 11, wherein
the abnormality is at least one of:
when the image processing engine associated with one of the image processing icons placed on the screen includes a function of identifying a person, a plurality of persons included in a frame image constituting the image data being analyzed are identical; and
when the image processing engine associated with the one of the image processing icons placed on the screen includes a function of identifying a person and a target of the analysis is a plurality of pieces of image data acquired by capturing images of different regions in a continuous space, a number of one or more persons that are analyzed as being identical among the plurality of pieces of image data is less than a threshold value.

14. The image analysis apparatus according to claim 1, wherein the at least one processor configured to execute the instructions to:
accept selection of part or all of the plurality of icons placed and connected on the screen and holding as a component, the selected part or all of the plurality of icons and a connection relation between the selected part or all of the plurality of icons.

15. The image analysis apparatus according to claim 1, wherein
the image processing icons include at least one of:
a detection icon associated with a detection engine for detecting a detection target from image data;
a tracking icon associated with a tracking engine for tracking a tracking target in the image data;
a feature value extraction icon associated with a feature value extraction engine for extracting a feature value in the image data;
a retrieval icon associated with a retrieval engine for retrieving a retrieval target from the image data; and
a redetermination icon associated with a redetermination engine for tracking a tracking target across a plurality of pieces of the image data.

16. The image analysis apparatus according to claim 1, wherein
setting of the flow of data includes:
determining, when the connection instruction is accepted, whether a connection between the specified icons is included in prohibition data indicating a prohibition related to the connection between the icons and performing prohibition processing, based on a result of determination; and
setting the flow of data between the specified icons in accordance with the connection instruction and the prohibition processing and displaying the flow on the screen.

17. The image analysis apparatus according to claim 16, wherein
the prohibition processing includes at least one of not generating the connection relation based on the connection instruction, correcting the connection instruction by a predetermined method, and providing notification that the connection between the specified icons related to the connection instruction is prohibited.

18. The image analysis apparatus according to claim 1, wherein
the image processing engines include processing engines with different functions related to image processing, and
at least one of a shape, a color, a pattern, and a style of an outline of the image processing icons is varied for each function of the image processing engines.

19. An image analysis method comprising:
accepting, by a processor, an instruction for placing, on a screen, a plurality of icons, and placing the plurality of icons on the screen in accordance with the instruction, the plurality of icons including a plurality of input source icons, a plurality of imaging processing icons, and at least one output destination icon, each input source icon indicating an input source of image data that is a target of analysis, each image processing icon indicating an image processing engine for the image data to generate a processing result, and each output destination icon indicating an output destination of the processing result;
accepting, by the processor, a connection instruction for connecting specified icons that have been placed on the screen; and
setting, by the processor, a flow of data between the specified icons in accordance with the connection instruction and displaying the flow on the screen, wherein
the connection instruction includes at least an instruction to connect at least one of the plurality of input source icons and the at least one output destination icon such that at least one of the plurality of image processing icons is included between the at least one of the plurality of input source icons and the at least one output destination icon.

20. A non-transitory storage medium storing a program executable by a computer to perform:
accepting an instruction for placing, on a screen, a plurality of icons, and placing the plurality of icons on the screen in accordance with the instruction, the plurality of icons including a plurality of input source icons, a plurality of imaging processing icons, and at least one output destination icon, each input source icon indicating an input source of image data that is a target of analysis, each image processing icon indicating an image processing engine for the image data to generate a processing result, and each output destination icon indicating an output destination of the processing result;
accepting a connection instruction for connecting specified icons that have been placed on the screen; and
setting a flow of data between the specified icons in accordance with the connection instruction and displaying the flow on the screen, wherein the connection instruction includes at least an instruction to connect at least one of the plurality of input source icons and the at least one output destination icon such that at least one of the plurality of image processing icons is included between the at least one of the plurality of input source icons and the at least one output destination icon.

\* \* \* \* \*